US 9,806,376 B2

(12) United States Patent
Kako et al.

(10) Patent No.: US 9,806,376 B2
(45) Date of Patent: Oct. 31, 2017

(54) ENERGY STORAGE DEVICE

(71) Applicant: GS Yuasa International Ltd., Kyoto-shi, Kyoto (JP)

(72) Inventors: Tomonori Kako, Kyoto (JP); Sumio Mori, Kyoto (JP); Akihiko Miyazaki, Kyoto (JP); Kenta Nakai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 127 days.

(21) Appl. No.: 14/833,558

(22) Filed: Aug. 24, 2015

(65) Prior Publication Data

US 2016/0064775 A1    Mar. 3, 2016

(30) Foreign Application Priority Data

Aug. 28, 2014   (JP) .................................. 2014-174433

(51) Int. Cl.
*H01M 10/0567* (2010.01)
*H01M 4/587* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0567; H01M 10/0525; H01M 10/0568; H01M 4/587; H01M 4/525; H01M 4/505; H01M 2300/004
See application file for complete search history.

(56) References Cited

U.S. PATENT DOCUMENTS 8,470,472 B2 *   6/2013  Nishie ................. H01M 10/052
                                                 29/623.1
8,986,881 B2     3/2015  Miyazaki
                         (Continued)

FOREIGN PATENT DOCUMENTS

JP    2007173014 A2    7/2007
JP    2007179883 A  *  7/2007
                (Continued)

OTHER PUBLICATIONS

Communication under Article 94(3) EPC dated Feb. 15, 2017 issued in the corresponding European patent application No. 15181938.0.
(Continued)

*Primary Examiner* — Jane Rhee
(74) *Attorney, Agent, or Firm* — Rankin, Hill & Clark LLP

(57) ABSTRACT

Provided is an energy storage device including an electrolyte solution including a compound represented by the general formula (1), a compound represented by the general formula (2), and a compound represented by the general formula (3):

General Formula (1)

$$\left[ A^{a+}_p \quad (R^2)_n - G \underset{E^2}{\overset{E^1}{\diagup}} \underset{\diagdown}{\overset{\diagup}{\diagdown}} (R^1)_q \underset{O}{\overset{O}{\diagdown}} \right]_m^{b-}$$

(Continued)

-continued

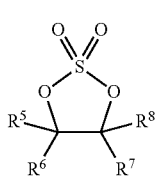

General Formula (2)

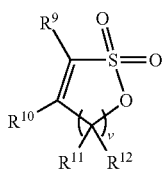

General Formula (3)

18 Claims, 3 Drawing Sheets

(51) Int. Cl.
*H01M 4/525* (2010.01)
*H01M 4/505* (2010.01)
*H01M 10/0525* (2010.01)
*H01M 10/0568* (2010.01)

(52) U.S. Cl.
CPC ....... *H01M 4/587* (2013.01); *H01M 10/0525* (2013.01); *H01M 10/0568* (2013.01); *C01P 2004/60* (2013.01); *H01M 2300/004* (2013.01)

(56) References Cited

U.S. PATENT DOCUMENTS

2009/0226808 A1    9/2009   Hiwara
2010/0323244 A1*   12/2010   Chiang .................. H01B 1/122
                                            429/220

FOREIGN PATENT DOCUMENTS

| JP | 3974012 B2 | 9/2007 |
| JP | 4190162 | 12/2008 |
| JP | 2013206791 A2 | 10/2013 |
| JP | 2014170689 A2 | 9/2014 |
| JP | 5621770 | 11/2014 |
| WO | 2007043624 A1 | 4/2007 |

OTHER PUBLICATIONS

Azuma H et al., "Advanced carbon anode materials for lithium ion cells", Journal of Power Sources, Sep. 1, 1999, pp. 1-7, vol. 81-82.
Goriparti Subrahmanyam et al., "Review on recent progress of nanostructured anode materials for Li-ion batteries", Journal of Power Sources, Jan. 22, 2014, pp. 421-443, vol. 257.
Flandrois S et al., "Carbon materials for lithium-ion rechargeable batteries", Carbon, Feb. 1, 1999, pp. 165-180, vol. 37.

* cited by examiner

ENERGY STORAGE DEVICE

CROSS-REFERENCE TO RELATED APPLICATIONS

This application is based on Japanese Patent Application No. 2014-174433 filed on Aug. 28, 2014, the entire contents of which is hereby incorporated by reference.

FIELD

The present invention relates to an energy storage device.

BACKGROUND

As the energy storage device, for example, an energy storage device including an electrolyte solution including a specific compound as an additive is known.

As this type of an energy storage device, for example, an energy storage device, in which an electrolyte solution includes an unsaturated sultone compound such as 1,3-propene sultone as an additive, is known (JP 4190162 B1).

In such an energy storage device, a degradation of an electric capacity can be suppressed even when the energy storage device is left under elevated temperatures since the electrolyte solution includes an unsaturated sultone compound.

However, in such an energy storage device, since the electrolyte solution merely includes an unsaturated sultone compound as an additive, a degradation in power performance of an energy storage device may not be necessarily adequately suppressed when the energy storage device is left under elevated temperatures or charged/discharged repeatedly under elevated temperatures.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide an energy storage device in which a degradation in power performance of an energy storage device is adequately suppressed even when the energy storage device is left or charged and discharged repeatedly under elevated temperatures.

An energy storage device according to an aspect of the present invention includes an electrolyte solution including a compound represented by the general formula (1), a compound represented by the general formula (2), and a compound represented by the general formula (3):

General Formula (1)

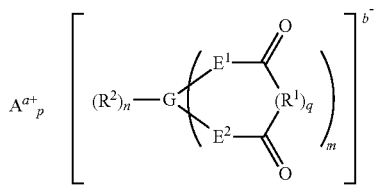

wherein G represents a transition metal, or an element of Group 13, Group 14, or Group 15 of a periodic table, $A^{a+}$ represents a metal ion, a proton or an onium ion, a represents an integer of 1 to 3, b represents an integer of 1 to 3, p represents b/a, m represents an integer of 1 to 4, n represents an integer of 0 to 8, q represents 0 or 1, $R^1$ represents an alkylene group having 1 to 10 carbon atoms, a halogenated alkylene group having 1 to 10 carbon atoms, an arylene group having 6 to 20 carbon atoms or a halogenated arylene group having 6 to 20 carbon atoms (these alkylene group and arylene group may have a substituent or a heteroatom in their structure), $R^2$ represents halogen, an alkyl group having 1 to 10 carbon atoms, a halogenated alkyl group having 1 to 10 carbon atoms, an aryl group having 6 to 20 carbon atoms, a halogenated aryl group having 6 to 20 carbon atoms, or $E^3R^3$ (these alkyl group and aryl group may have a substituent or a heteroatom in their structure), $E^1$, $E^2$ and $E^3$ independently represent O, S or $NR^4$, and $R^3$ and $R^4$ independently represent hydrogen, an alkyl group having 1 to 10 carbon atoms, a halogenated alkyl group having 1 to 10 carbon atoms, an aryl group having 6 to 20 carbon atoms, or a halogenated aryl group having 6 to 20 carbon atoms (these alkyl group and aryl group may have a substituent or a heteroatom in their structure).

General Formula (2)

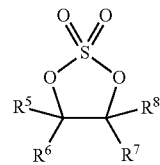

wherein $R^5$, $R^6$, $R^7$, and $R^8$ independently represent hydrogen or an alkyl group having 1 to 3 carbon atoms; and General Formula (3)

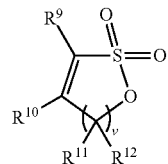

wherein $R^9$ to $R^{12}$ represent independently hydrogen, fluorine, or an alkyl group having 1 to 12 carbon atoms which optionally includes fluorine, and v represents an integer of 1 to 3.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
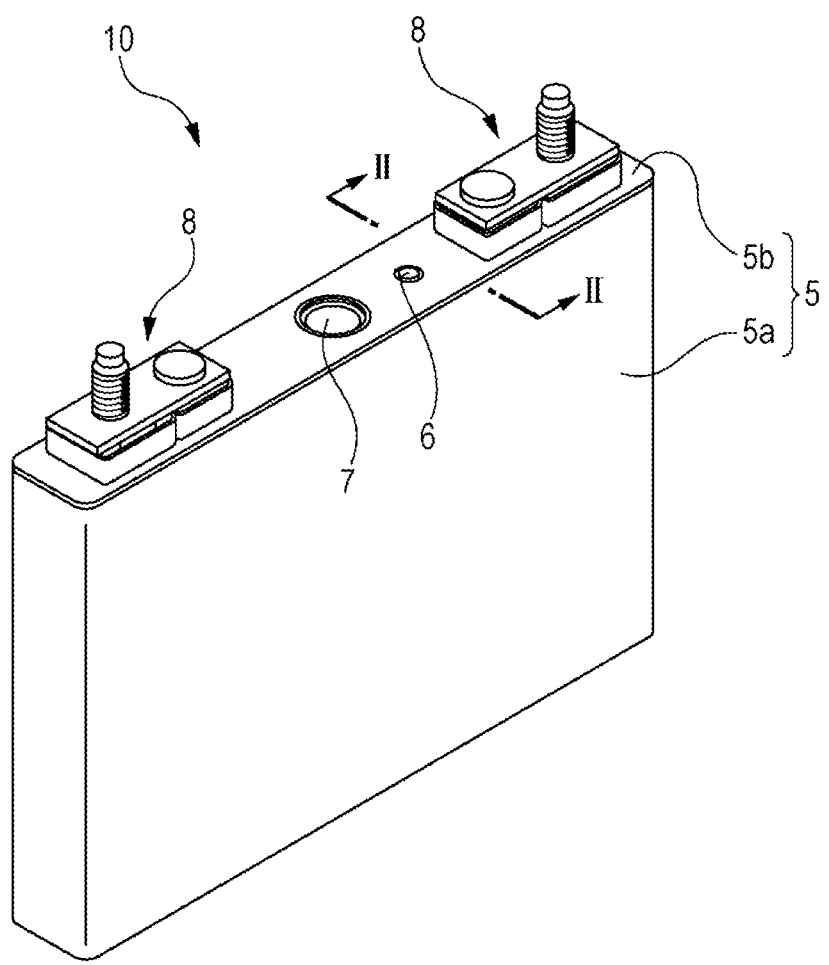
FIG. 1 is a view showing an appearance of a nonaqueous electrolyte secondary battery (lithium ion secondary battery) as an energy storage device.

An energy storage device according to an aspect of the present invention includes an electrolyte solution including a compound represented by the general formula (1), a compound represented by the general formula (2), and a compound represented by the general formula (3):

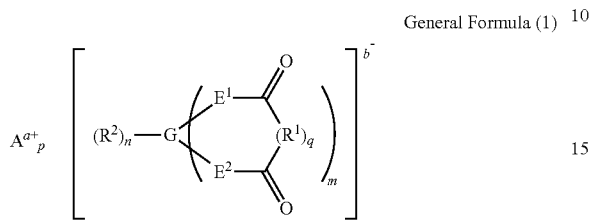

General Formula (1)

wherein G represents a transition metal, or an element of Group 13, Group 14, or Group 15 of a periodic table, $A^{a+}$ represents a metal ion, a proton or an onium ion, a represents an integer of 1 to 3, b represents an integer of 1 to 3, p represents b/a, m represents an integer of 1 to 4, n represents an integer of 0 to 8, q represents 0 or 1, $R^1$ represents an alkylene group having 1 to 10 carbon atoms, a halogenated alkylene group having 1 to 10 carbon atoms, an arylene group having 6 to 20 carbon atoms or a halogenated arylene group having 6 to 20 carbon atoms (these alkylene group and arylene group may have a substituent or a heteroatom in their structure), $R^2$ represents halogen, an alkyl group having 1 to 10 carbon atoms, a halogenated alkyl group having 1 to 10 carbon atoms, an aryl group having 6 to 20 carbon atoms, a halogenated aryl group having 6 to 20 carbon atoms, or $E^3R^3$ (these alkyl group and aryl group may have a substituent or a heteroatom in their structure), $E^1$, $E^2$ and $E^3$ independently represent O, S or $NR^4$, and $R^3$ and $R^4$ independently represent hydrogen, an alkyl group having 1 to 10 carbon atoms, a halogenated alkyl group having 1 to 10 carbon atoms, an aryl group having 6 to 20 carbon atoms, or a halogenated aryl group having 6 to 20 carbon atoms (these alkyl group and aryl group may have a substituent or a heteroatom in their structure).

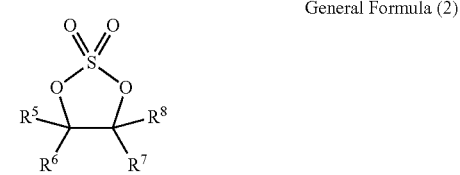

General Formula (2)

wherein $R^5$, $R^6$, $R^7$, and $R^8$ independently represent hydrogen or an alkyl group having 1 to 3 carbon atoms; and

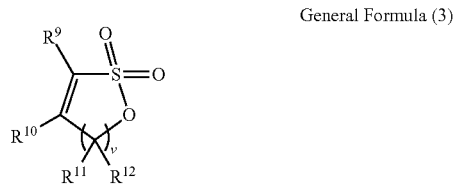

General Formula (3)

wherein $R^9$ to $R^{12}$ represent independently hydrogen, fluorine, or an alkyl group having 1 to 12 carbon atoms which optionally includes fluorine, and v represents an integer of 1 to 3.

In an aspect of the energy storage device according to the present invention, the compound represented by the above-mentioned general formula (1) is preferably a compound represented by the following general formula (1a):

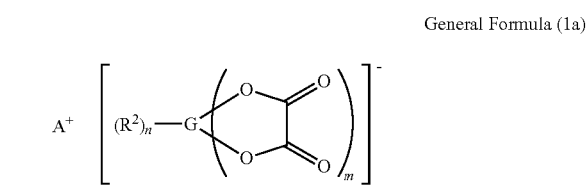

General Formula (1a)

wherein G represents a phosphorus element or a boron element, $A^+$ represents an alkali metal ion, m represents an integer of 1 to 3, n represents an integer of 0 to 4, and $R^2$ represents a halogen.

In another aspect of the energy storage device according to the present invention, the compound represented by the above-mentioned general formula (2) is preferably a compound represented by the following general formula (2a):

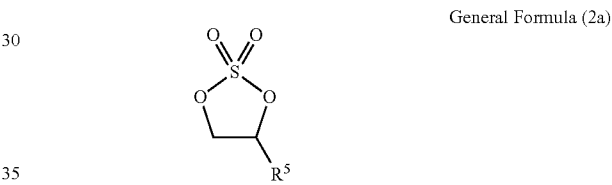

General Formula (2a)

wherein $R^5$ represents hydrogen or an alkyl group having 1 to 3 carbon atoms.

In another aspect of the energy storage device according to the present invention, the compound represented by the above-mentioned general formula (3) is preferably a compound represented by the following general formula (3a):

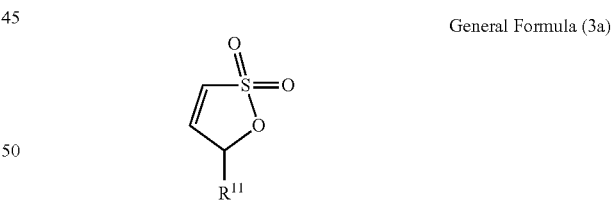

General Formula (3a)

wherein $R^{11}$ represents hydrogen or an alkyl group having 1 to 3 carbon atoms.

In another aspect of the energy storage device according to the present invention, the electrolyte solution may include the compound represented by the general formula (1) in an amount of not less than 0.10% by mass and not more than 1.00% by mass.

In another aspect of the energy storage device according to the present invention, the electrolyte solution preferably includes the compound represented by the general formula (2) in an amount of not less than 0.10% by mass and not more than 2.00% by mass.

In another aspect of the energy storage device according to the present invention, the electrolyte solution preferably includes the compound represented by the general formula (3) in an amount of not less than 0.05% by mass and not more than 1.00% by mass.

In another aspect of the energy storage device according to the present invention, the mass ratio between the compound represented by the general formula (1) and the compound represented by the general formula (2) is preferably 1:0.10 to 1:20.

In another aspect of the energy storage device according to the present invention, the mass ratio between the compound represented by the general formula (1) and the compound represented by the general formula (3) is preferably 1:0.05 to 1:10.

In another aspect of the energy storage device according to the present invention, the mass ratio between the compound represented by the general formula (2) and the compound represented by the general formula (3) is preferably 1:0.025 to 1:10.

As another aspect of the energy storage device according to the present invention, the energy storage device may further include a positive electrode. The positive electrode may contain a positive active material and the positive active material may be a lithium metal composite oxide represented by the chemical composition of $Li_xNi_yMn_zCo_{(1-y-z)}O_2$ ($0<x\leq1.3$, $0<y<1$, and $0<z<1$).

As another aspect of the energy storage device according to the present invention, the energy storage device may further comprise a negative electrode. The negative electrode may contain a negative active material and the negative active material may be non-graphitizable carbon.

As another aspect of the energy storage device according to the present invention, it is preferred that the negative active material is in the form of particles and an average particle size D50 of the negative active material is 1.0 μm or more and 4.5 μm or less.

The energy storage device according to the aspects of the present invention exerts the effect of relatively adequately suppressing a degradation in power performance of the energy storage device even when the energy storage device is left or charged and discharged repeatedly under elevated temperatures.

Hereinafter, an embodiment of the energy storage device according to the present invention will be described with reference to drawings.

An energy storage device 10 of the present embodiment includes an electrolyte solution including a compound represented by the general formula (1), a compound represented by the general formula (2), and a compound represented by the general formula (3):

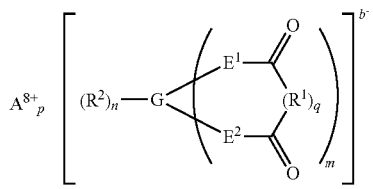

General Formula (1)

wherein G represents a transition metal, or an element of Group 13, Group 14, or Group 15 of a periodic table, $A^{a+}$ represents a metal ion, a proton or an onium ion, a represents an integer of 1 to 3, b represents an integer of 1 to 3, p represents b/a, m represents an integer of 1 to 4, n represents an integer of 0 to 8, q represents 0 or 1, $R^1$ represents an alkylene group having 1 to 10 carbon atoms, a halogenated alkylene group having 1 to 10 carbon atoms, an arylene group having 6 to 20 carbon atoms or a halogenated arylene group having 6 to 20 carbon atoms (these alkylene group and arylene group may have a substituent or a heteroatom in their structure), $R^2$ represents halogen, an alkyl group having 1 to 10 carbon atoms, a halogenated alkyl group having 1 to 10 carbon atoms, an aryl group having 6 to 20 carbon atoms, a halogenated aryl group having 6 to 20 carbon atoms, or $E^3R^3$ (these alkyl group and aryl group may have a substituent or a heteroatom in their structure), $E^1$, $E^2$ and $E^3$ independently represent O, S or $NR^4$, and $R^3$ and $R^4$ independently represent hydrogen, an alkyl group having 1 to 10 carbon atoms, a halogenated alkyl group having 1 to 10 carbon atoms, an aryl group having 6 to 20 carbon atoms, or a halogenated aryl group having 6 to 20 carbon atoms (these alkyl group and aryl group may have a substituent or a heteroatom in their structure).

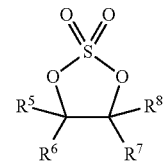

General Formula (2)

wherein $R^5$, $R^6$, $R^7$, and $R^8$ independently represent hydrogen or an alkyl group having 1 to 3 carbon atoms; and

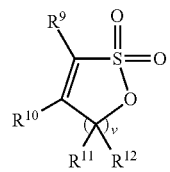

General Formula (3)

wherein $R^9$ to $R^{12}$ represent independently hydrogen, fluorine, or an alkyl group having 1 to 12 carbon atoms which optionally includes fluorine, and v represents an integer of 1 to 3.

Examples of the energy storage device 10 of the present embodiment include a nonaqueous electrolyte secondary battery 10 (lithium ion secondary battery 10) shown in FIG. 1.

The nonaqueous electrolyte secondary battery 10 includes, as shown in FIG. 1, a case 5 capable of being hermetically sealed for housing the electrolyte solution and an electrode assembly 4 therein.

The electrolyte solution contains at least an electrolyte salt and a nonaqueous solvent. The electrolyte solution further includes the compounds respectively represented by the general formula (1), the general formula (2) and the general formula (3) as additives.

Figure 3:
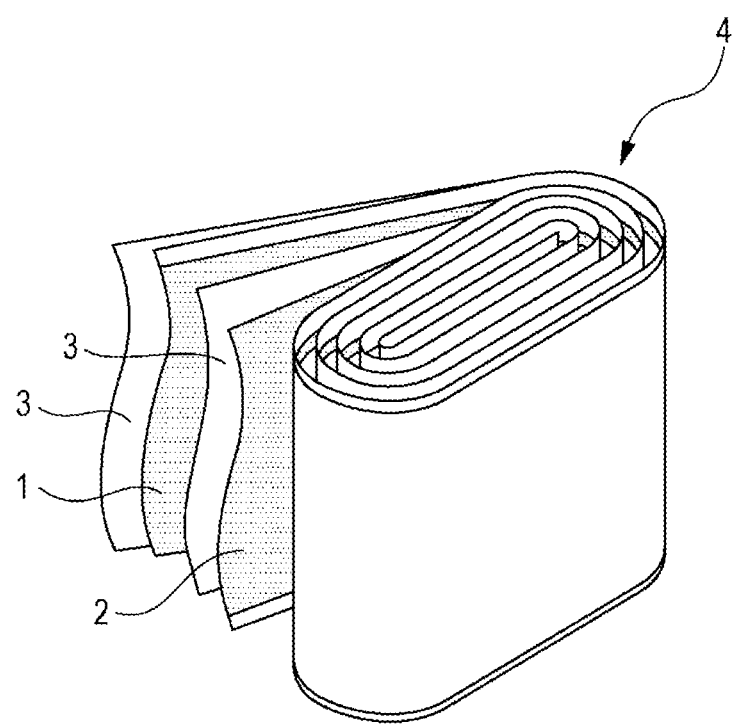
FIG. 3 is a schematic view showing an appearance of an electrode assembly.

The electrode assembly 4 is, for example, as shown in FIG. 3, formed by winding a sheet-shaped positive electrode 1 containing a positive active material, a sheet-shaped negative electrode 2 containing a negative active material and a sheet-shaped separator 3 disposed between the positive electrode 1 and the negative electrode 2.

Figure 2:
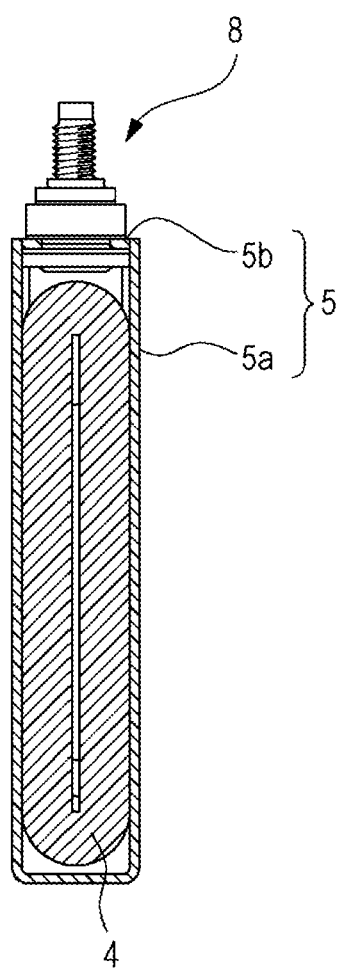
FIG. 2 is a sectional view schematically showing a cross-section taken on line II-II (a cross-section obtained in cutting the energy storage device in a thickness direction of a lid plate) in FIG. 1.

The case 5 has a case main body 5a which houses the electrode assembly 4 and the electrolyte solution and is opened toward one direction, and a lid plate 5b for blocking the opening of the case main body 5a, as shown in FIG. 1 and FIG. 2.

In the energy storage device 10 of the present embodiment, an electrolyte solution includes a compound represented by the general formula (1), a compound represented by the general formula (2), and a compound represented by the general formula (3). As a result of this, according to the energy storage device 10 of the present embodiment, degradation in power performance of the energy storage device can be adequately suppressed even when the energy storage device is left or charged and discharged repeatedly under elevated temperatures.

As the compound represented by the general formula (1), a compound represented by the following general formula (1a) is preferred:

$$A^+ \left[ (R^2)_n - G \left\langle \begin{array}{c} O \\ O \end{array} \right\rangle_m \right]^- \quad \text{General Formula (1a)}$$

wherein G represents a phosphorus element or a boron element, $A^+$ represents an alkali metal ion, m represents an integer of 1 to 3, n represents an integer of 0 to 4, and $R^2$ represents a halogen.

In the general formula (1a), when G is a phosphorus element (P), it is preferred that m is 1 and n is 4, or m is 2 and n is 2, or m is 3 and n is 0.

In the general formula (1a), when G is a boron element (B), it is preferred that m is 1 and n is 2, or m is 2 and n is 0.

Examples of the compound represented by the general formula (1a) include compounds respectively represented by the following formulas:

Formula (1-1)

Formula (1-2)

Formula (1-3)

Formula (1-4)

Formula (1-5)

For the compound represented by the general formula (1), a more preferred compound is at least one selected from the group consisting of a compound represented by the above-mentioned formula (1-1), a compound represented by the above-mentioned formula (1-2) and a compound represented by the above-mentioned formula (1-3).

The compound represented by the general formula (1) is included in the electrolyte solution preferably in an amount of not less than 0.10% by mass and not more than 1.00% by mass, more preferably in an amount of not less than 0.20% by mass and not more than 0.60% by mass, and moreover preferably in an amount of not less than 0.30% by mass and not more than 0.50% by mass.

When the compound represented by the general formula (1) is included in the electrolyte solution in the concentration of the above-mentioned range, there is an advantage that degradation in power performance of the battery under elevated temperatures can be more sufficiently suppressed.

Examples of the compound represented by the general formula (2) include cyclic sulfuric acid esters such as ethylene glycol sulfate, 1,2-propanediol sulfate, 1,3-propanediol sulfate, 1,2-butanediol sulfate, 1,3-butanediol sulfate, 2,3-butanediol sulfate, phenylethylene glycol sulfate, methylphenylethylene glycol sulfate and ethylphenylethylene glycol sulfate.

Moreover, examples of the compound represented by the general formula (2) include halides of the cyclic sulfuric acid esters.

As the compound represented by the general formula (2), a compound represented by the following general formula (2a) is preferred:

General Formula (2a)

wherein $R^5$ represents hydrogen or an alkyl group having 1 to 3 carbon atoms.

For the compound represented by the general formula (2a), a more preferred compound is at least one selected from the group consisting of a compound represented by the following formula (2-1), a compound represented by the following formula (2-2) and a compound represented by the following formula (2-3).

Formula (2-1)

Formula (2-2)

Formula (2-3)

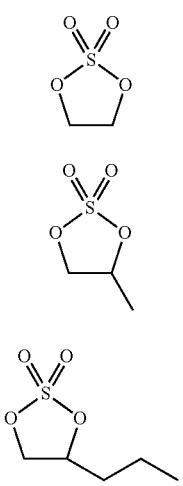

The compound represented by the general formula (2) is included in the electrolyte solution preferably in an amount of not less than 0.10% by mass and not more than 2.00% by mass, more preferably in an amount of not less than 0.20% by mass and not more than 1.10% by mass, and moreover preferably in an amount of not less than 0.30% by mass and not more than 1.00% by mass.

When the compound represented by the general formula (2) is included in the electrolyte solution in the concentration of the above-mentioned range, there is an advantage that degradation in power performance of the battery under elevated temperatures can be more sufficiently suppressed.

Examples of the compound represented by the general formula (3) include compounds respectively represented by the following chemical structural formulas:

As the compound represented by the general formula (3), a compound represented by the following general formula (3a) is preferred:

General Formula (3a)

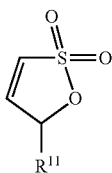

wherein $R^{11}$ represents hydrogen or an alkyl group having 1 to 3 carbon atoms.

For the compound represented by the general formula (3a), a more preferred compound is at least one selected from the group consisting of a compound represented by the following formula (3-1), a compound represented by the following formula (3-2) and a compound represented by the following formula (3-3).

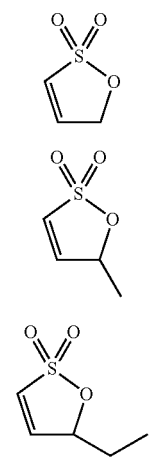

Formula (3-1)

Formula (3-2)

Formula (3-3)

The compound represented by the general formula (3) is included in the electrolyte solution preferably in an amount of not less than 0.05% by mass and not more than 1.00% by mass, more preferably in an amount of not less than 0.10% by mass and not more than 0.60% by mass, and moreover preferably in an amount of not less than 0.10% by mass and not more than 0.50% by mass.

When the compound represented by the general formula (3) is included in the electrolyte solution in the concentration of the above-mentioned range, there is an advantage that degradation in power performance of the battery under elevated temperatures can be more sufficiently suppressed.

The electrolyte solution includes a compound represented by the general formula (1), a compound represented by the general formula (2) and a compound represented by the general formula (3) preferably in a total amount of not less than 0.25% by mass and not more than 4.00% by mass, and more preferably in a total amount of not less than 0.70% by mass and not more than 2.00% by mass.

In the electrolyte solution, the mass ratio for the compound represented by the general formula (1), the compound represented by the general formula (2) and the compound represented by the general formula (3) is preferably within a predetermined range.

The mass ratio between the compound represented by the general formula (1) and the compound represented by the general formula (2) is preferably 1:1/10 to 1:20 and more preferably 1:3/5 to 1:10/3.

The mass ratio between the compound represented by the general formula (1) and the compound represented by the general formula (3) is preferably 1:1/20 to 1:10 and more preferably 1:1/5 to 1:5/3.

The mass ratio between the compound represented by the general formula (2) and the compound represented by the general formula (3) is preferably 1:1/40 to 1:10 and more preferably 1:1/10 to 1:5/3.

When the mass ratio for the compounds represented by the general formulas (1) to (3) is in the above-mentioned range, there is an advantage that degradation in power performance of the battery under elevated temperatures can be more sufficiently suppressed.

Incidentally, the amounts of the above compounds included in the electrolyte solution can be measured (quantified) by gas chromatographic analysis (GC), gas chromatograph mass spectrometry (GC-MS), ion chromatography analysis or the like.

The electrolyte solution usually includes a nonaqueous solvent and an electrolyte salt as a constituent component in addition to the compounds represented by the general formulas (1) to (3).

For the nonaqueous solvent, nonaqueous solvents commonly used in the energy storage device and the like are employed.

Specific examples of the nonaqueous solvents include cyclic carbonic acid esters; lactones; chain carbonates; chain esters; ethers; and nitriles.

Examples of the cyclic carbonic acid esters include propylene carbonate, ethylene carbonate, butylene carbonate, chloroethylene carbonate, and the like.

Examples of the lactones include γ-butyrolactone, γ-valerolactone and the like.

Examples of the chain carbonates include dimethyl carbonate, diethyl carbonate, ethylmethyl carbonate and the like.

Examples of the chain esters include methyl formate, methyl acetate, methyl butyrate and the like.

Examples of the ethers include 1,3-dioxane, 1,4-dioxane, 1,2-dimethoxyethane, 1,4-dibutoxyethane, methyl diglyme and the like.

Examples of the nitriles include acetonitrile, benzonitrile and the like.

Furthermore, examples of the nonaqueous solvents include tetrahydrofuran and derivatives thereof, dioxolan and derivatives thereof, ethylene sulfide, sulfolane, sultone and derivatives thereof, and the like.

For the nonaqueous solvent, a compound alone of the above-mentioned compounds or a mixture of two or more thereof is employed, but the nonaqueous solvent is not limited to these compounds.

Examples of the electrolyte salt include lithium salts such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$ and $Li_2B_{10}Cl_{10}$.

For the electrolyte salt, a compound alone of the above-mentioned compounds or a mixture of two or more thereof is employed, but the electrolyte salt is not limited to these compounds.

The concentration of the electrolyte salt in the electrolyte solution is preferably not less than 0.5 mol/L and not more than 1.5 mol/L, and more preferably not less than 0.8 mol/L and not more than 1.2 mol/L in order to attain more certainly a battery having excellent battery performance.

The electrolyte solution may further include one or more kinds of other additives. Specific examples of other additives include, but are not limited to, carbonates; vinyl esters;

sulfides; cyclic disulfonic acid esters; sulfonic acid esters; sulfurous acid esters; chain sulfuric acid esters; aromatic compounds; halogenated alkanes; silyl esters; and difluoro lithium phosphate.

Examples of carbonates include vinylene carbonate, methyl vinylene carbonate, ethyl vinylene carbonate, propyl vinylene carbonate, phenyl vinylene carbonate, vinyl ethylene carbonate, divinyl ethylene carbonate, dimethyl vinylene carbonate, diethyl vinylene carbonate, fluoroethylene carbonate, and the like.

Examples of vinyl esters include vinyl acetate, vinyl propionate, and the like.

Examples of sulfides include diallyl sulfide, allyl phenyl sulfide, allyl vinyl sulfide, allyl ethyl sulfide, propyl sulfide, diallyl disulfide, allyl ethyl disulfide, allyl propyl disulfide, allyl phenyl disulfide, and the like.

Examples of cyclic disulfonic acid esters include methyl dimethylsulfonate, ethyl dimethylsulfonate, propyl dimethylsulfonate, ethyl diethylsulfonate, propyl diethylsulfonate, and the like.

Examples of sulfonic acid esters include bis(vinylsulfonyl)methane, methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, methyl benzylsulfonate, ethyl benzylsulfonate, propyl benzylsulfonate, benzyl methanesulfonate, benzyl ethanesulfonate, benzyl propanesulfonate, and the like.

Examples of sulfurous acid esters include dimethyl sulfite, diethyl sulfite, ethylmethyl sulfite, methyl propyl sulfite, ethyl propyl sulfite, diphenyl sulfite, methyl phenyl sulfite, ethyl phenyl sulfite, vinyl ethylene sulfite, divinyl ethylene sulfite, propylene sulfite, vinyl propylene sulfite, butylene sulfite, vinyl butylene sulfite, vinylene sulfite, phenyl ethylene sulfite, and the like.

Examples of chain sulfuric acid esters include dimethyl sulfate, diethyl sulfate, ethyl methyl sulfate, methyl propyl sulfate, ethyl propyl sulfate, methyl phenyl sulfate, ethyl phenyl sulfate, phenyl propyl sulfate, benzyl methyl sulfate, benzyl ethyl sulfate, and the like.

Examples of aromatic compounds include benzene, toluene, xylene, fluorobenzene, biphenyl, cyclohexylbenzene, 2-fluorobiphenyl, 4-fluorobiphenyl, diphenyl ether tert-butylbenzene, ortho-terphenyl, meta-terphenyl, naphthalene, fluoronaphthalene, cumene, fluorobenzene, 2,4-difluoroanisole, and the like.

Examples of halogenated alkanes include perfluoro octane and the like.

Examples of silyl esters include tris(trimethylsilyl)borate, bis(trimethylsilyl) sulfate, tris(trimethylsilyl) phosphate, and the like.

Incidentally, as the additive, the compounds mentioned above may be used alone, and it is also possible to use two or more kinds together.

The positive electrode 1 is formed into, for example, a sheet shape as shown in FIG. 3. Further, the positive electrode 1 includes a particulate positive active material.

Specifically, the positive electrode 1 includes a positive current collector formed into, for example, a sheet shape, and positive composite layers which are disposed on both sides of the positive current collector and contain the particulate positive active materials.

Examples of the positive active material include common materials capable of absorbing/releasing lithium ions.

For example, the positive active material may be selected from among composite oxides ($Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, $Li_xNi_yMn_{(2-y)}O_4$, etc.) represented by $Li_xMO_u$ (M represents at least one transition metal) and polyanion compounds ($LiFePO_4$, $LiMnPO_4$, $LiNiPO_4$, $LiCoPO_4$, $Li_3V_2(PO_4)_3$, $Li_2MnSiO_4$, $Li_2CoPO_4F$, etc.) represented by $Li_wMe_d(XO_e)_f$ (Me represents at least one transition metal and X is, for example, P, Si, B, V).

An element in these compounds or a part of the polyanion compounds may be substituted with another element or anion species. Further, the surface of the positive active material may be coated with a metal oxide such as $ZrO_2$, MgO or $Al_2O_3$ or carbon.

More examples of the positive active material include conductive polymers such as disulfide, polypyrrole, polyaniline, polyparastyrene, polyacetylene and polyacene materials; and carbonaceous materials having a pseudo-graphite structure; however, it is not limited to these materials.

In the positive active material, these compounds may be used singly or may be used as a mixture of two or more thereof.

The positive active material is preferably a lithium metal composite oxide represented by the chemical composition of $Li_xNi_yMn_zCo_{(1-y-z)}O_2$ ($0<x≤1.3$, $0<y<1$, and $0<z<1$) in that a degradation in power performance of the battery including an electrolyte solution including the above-mentioned three kinds of compounds can be more sufficiently suppressed under elevated temperatures. That is, a lithium transition metal composite oxide containing Ni, Mn, and Co as the transition metal is preferred.

An average particle size D50 of the positive active material is usually in the range of 3 μm or more and 20 μm or less. The average particle size is determined by measurement of a particle size distribution as mentioned below.

The positive composite layer usually further includes a conductive agent, a binder, a thickener and the like as constituent components.

The conductive agent is not particularly limited, and examples thereof include natural graphite (scaly graphite, flaky graphite, earthy graphite, etc.), artificial graphite, carbon black, acetylene black, Ketjen black, carbon whisker, carbon fibers, conductive ceramics and the like.

For the conductive agent, for example, a material alone of the above-mentioned materials or a mixture of two or more thereof is employed.

The binder is not particularly limited, and examples thereof include thermoplastic resins such as polytetrafluoroethylene (PTFE), polyvinylidene fluoride (PVDF), polyethylene and polypropylene; ethylene-propylene-diene terpolymer (EPDM), sulfonated EPDM, styrene-butadiene rubber (SBR), fluorine-contained rubber and the like.

For the binder, for example, a material alone of the above-mentioned materials or a mixture of two or more thereof is employed.

The thickener is not particularly limited, and examples thereof include polysaccharides such as carboxymethyl cellulose and methyl cellulose.

For the thickener, for example, a material alone of the above-mentioned materials or a mixture of two or more thereof is employed.

Examples of a material of the positive current collector include metals such as aluminum, titanium, stainless steel, and nickel.

Examples of a material of the positive current collector other than metal include a furnace carbon, a conductive polymer, a conductive glass and the like.

The thickness of the positive current collector is not particularly limited; however, the thickness is usually 10 μm or more and 30 μm or less.

The negative electrode 2 is formed into, for example, a sheet shape as shown in FIG. 3. Further, the negative electrode 2 usually contains a particulate negative active material.

Specifically, the negative electrode 2 includes a negative current collector formed into, for example, a sheet shape, and negative composite layers disposed on both sides of the negative current collector. Further, the negative composite layer contains the particulate negative active materials.

Examples of the negative active material include at least one selected from among carbonaceous materials, lithium metal, alloys capable of absorbing and releasing lithium ions (lithium alloy, etc.), metal oxides represented by the general formula $JO_t$ (J represents at least one element selected from among W, Mo, Si, Cu and Sn, and t is a numerical value satisfying a relationship of $0<t\leq2$), lithium metal oxides ($Li_4Ti_5O_{12}$, etc.), and polyphosphate compounds.

Examples of the carbonaceous materials include at least one of graphites and amorphous carbons.

Examples of the amorphous carbons include non-graphitizable carbons (hard carbons) and easily graphitizable carbons (soft carbons).

As the carbonaceous material, the non-graphitizable carbons (hard carbons) are preferred in that a degree of expansion/contraction during the charge-discharge is lower.

Examples of the alloys capable of absorbing and releasing lithium ions include at least one lithium alloy of a lithium-aluminum alloy, a lithium-lead alloy, a lithium-tin alloy, a lithium-aluminum-tin alloy and a lithium-gallium alloy; and a wood's metal.

A particle size D50 of the negative active material is usually in the range of 0.5 μm or more and 15 μm or less. The particle size is determined by the same measuring method as that of the particle size of the positive active material.

An average particle size D50 of the negative active material is preferably 1.0 μm or more and 4.5 μm or less. When the average particle size D50 of the negative active material is in this range, there is an advantage that degradation in power performance under elevated temperatures of the battery including an electrolyte solution including the above-mentioned three kinds of compounds can be more sufficiently suppressed.

The average particle size D50 of the positive active material or the negative active material is an average particle diameter (also referred to as a median diameter) at which a cumulative volume curve drawn from a small diameter side in a particle size distribution of a particle diameter reaches 50%. Specifically, D50 is a diameter at which the powder is separated into two groups in terms of a particle diameter so that a volume of a group having a diameter larger than the diameter is equal to a volume of a group having a diameter smaller than the diameter. More specifically, the average particle size D50 is a value of D50 determined by measuring with a particle size distribution measurement apparatus (SALD-2000J, manufactured by SHIMADZU CORPORATION) of laser diffraction-scattering type.

For the negative active material, for example, a commercially available material can be used.

The negative composite layer, as with the positive composite layer, usually further includes the above-mentioned binder and thickener, and the like as constituent components.

Examples of a material of the negative current collector include metals such as copper, nickel, iron, stainless steel, titanium and aluminum.

Examples of a material of the negative current collector other than metal include a furnace carbon, a conductive polymer, a conductive glass and the like.

The thickness of the negative current collector is not particularly limited; however, the thickness is usually 5 μm or more and 30 μm or less.

Examples of a material of the separator 3 include a fabric cloth, a nonwoven fabric or a microporous membrane, respectively insoluble in an organic solvent. The separator 3 can be formed of, for example, a material alone of the fabric cloth, the nonwoven fabric or the microporous membrane, or a combination thereof.

As the microporous membrane, a synthetic resin microporous membrane made of a polyolefin resin such as polyethylene is preferred.

Examples of the synthetic resin microporous membrane include products obtained by laminating a plurality of microporous membranes which are different in the type of the material, the weight average molecular weight of the synthetic resin and porosity. Other examples of the synthetic resin microporous membrane include membranes including various plasticizers, antioxidants or flame retarders in adequate amounts, and membranes provided with an inorganic oxide, such as silica, applied onto one or both surfaces of the separator.

As the synthetic resin microporous membrane, a polyolefin-based microporous membrane is preferred in that a thickness, membrane strength and membrane resistance are adequate. A membrane preferably used for the polyolefin-based microporous membrane is, for example, a microporous membrane made of polyethylene and polypropylene, a microporous membrane made of polyethylene and polypropylene, which is combined with aramid or polyimide, or a microporous membrane formed by combining these membranes.

Specific examples of materials of the separator 3 include at least one of polyolefin-based resins such as polyethylene and polypropylene; polyester-based resins such as polyethylene terephthalate and polybutylene terephthalate; and fluorine-based resins.

Examples of the fluorine-based resins include at least one selected from the group consisting of polyvinylidene fluoride, vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

The case 5 has a case main body 5a which is formed into a hollow and cylindrical shape or a hollow and prismatic shape and is opened toward one direction, and a lid plate 5b which is formed into a plate shape so as to block the opening of the case main body 5a, as shown in FIG. 1.

The lid plate 5b is formed in such a way that its shape viewed from one face is nearly equal to the shape of an opening of the case main body 5a. Further, the lid plate 5b is formed so as to hermetically block the opening of the case main body 5a.

The lid plate 5b, for example, as shown in FIG. 1, is provided with an electrolyte solution filling hole 6 for filling an electrolyte solution into the case 5 after blocking the case main body 5a by the lid plate 5b.

Further, the lid plate 5b, for example, as shown in FIG. 1, includes a gas release vent 7 for preventing rupture of the case main body 5a due to an excessive pressure rise within the sealed case main body 5a.

The case 5 can be hermetically sealed and is configured to be hermetically sealed, for example, by blocking the electrolyte solution filling hole 6 after filling the electrolyte solution through the electrolyte solution filling hole 6.

Examples of a material of the case 5 include iron plated with nickel, stainless steel, aluminum, a metal-resin composite film and the like.

Incidentally, the energy storage device (battery) 10 includes two external terminals 8, for example, as shown in FIG. 1, and two external terminals 8 are configured to be electrically connected to the positive electrode 1 and the negative electrode 2, respectively.

The embodiment of the nonaqueous electrolyte secondary battery 10 is not particularly limited; however, a prismatic (flat type) battery as shown in FIG. 1 is suitable.

As the prismatic battery, a prismatic battery, as shown FIGS. 1 to 3, including an electrode assembly 4 formed by winding a positive electrode 1, a negative electrode 2 and a separator 3 is exemplified.

Next, a method for producing the energy storage device 10 (nonaqueous electrolyte secondary battery 10) of the present embodiment will be described.

In such a production method, for example, a positive electrode 1 and a negative electrode 2 are respectively prepared. Furthermore, an electrode assembly 4 is prepared by winding a sheet-shaped article formed by superimposing the positive electrode 1 and the negative electrode 2 with the separator 3 interposed therebetween. Then, the electrode assembly 4 and an electrolyte solution are housed in the case 5 to produce a nonaqueous electrolyte secondary battery 10.

In preparation of the positive electrode 1, for example, particulate positive active materials, a conductive agent, a binder, and a thickener are mixed with an organic solvent such as alcohol or toluene. Then, the resulting mixed solution is applied onto both surfaces of a sheet-shaped positive current collector. Then, the mixed solution is dried to volatilize an organic solvent from the mixed solution to prepare a sheet-shaped positive electrode 1 having positive composite layers disposed on both surfaces of the positive current collector.

In the preparation of the positive electrode 1, as a method of mixing the above-mentioned conductive agent, binder and thickener, for example, a method of dry- or wet-mixing the materials using a powder mixer such as V type mixers, S type mixers, Raikai mixers, ball mills or planetary ball mills, is employed.

Incidentally, the positive active material is prepared, for example, by a common solid baking method or coprecipitation method.

The negative electrode 2 can be prepared, for example, in the same manner as in the positive electrode 1.

In the preparation of the negative electrode 2, for example, particulate negative active materials, a binder, and a thickener are mixed with an organic solvent, and then the resulting mixed solution is applied onto both surfaces of a sheet-shaped negative current collector. The applied mixed solution is dried to volatilize an organic solvent from the mixed solution to prepare a sheet-shaped negative electrode 2 having negative composite layers disposed on both surfaces of the negative current collector.

Subsequently, a separator 3 is arranged between the prepared positive electrode 1 and the prepared negative electrode 2 to obtain a superimposed sheet-shaped article. Moreover, an electrode assembly 4 is prepared by winding the sheet-shaped article.

Subsequently, the wound electrode assembly 4 is placed in the case main body 5a of the case 5.

Then, the lid plate 5b is attached to the case main body 5a having the electrode assembly 4 placed therein. That is, the opening of the case main body 5a is blocked by the lid plate 5b. Thereafter, an electrolyte solution including the compounds represented by the general formulas (1) to (3), an electrolyte salt and a nonaqueous solvent is injected into the case 5.

Finally, the case 5 housing the electrolyte solution and the electrode assembly 4 therein is hermetically sealed.

Specifically, the case 5 is hermetically sealed by sealing an electrolyte solution filling hole 6 provided in the lid plate 5b.

The energy storage device of the present embodiment is as exemplified above, but the present invention is not limited to the energy storage device exemplified above.

That is, various types used in common energy storage devices can be employed within a scope which does not impair the effect of the present invention.

EXAMPLES

Next, the present invention will be described in more detail by way of examples; however, the present invention is not limited to these examples.

(Additives to be Mixed in an Electrolyte Solution)
Compound Represented by the General Formula (1)
Compound represented by the above formula (1-1) (hereinafter, also referred to as LiFOP)
Compound represented by the above formula (1-2) (hereinafter, also referred to as LiFOB)
Compound represented by the above formula (1-3) (hereinafter, also referred to as LiBOB)
Compound Represented by the General Formula (2)
Compound represented by the above formula (2-1) (hereinafter, also referred to as GLST)
Compound represented by the above formula (2-2) (hereinafter, also referred to as PGLST)
Compound represented by the above formula (2-3) (hereinafter, also referred to as PEGLST)
Compound Represented by the General Formula (3)
Compound represented by the above formula (3-1) (hereinafter, also referred to as PRS)
Compound represented by the above formula (3-2) (hereinafter, also referred to as MPRS)
Compound represented by the above formula (3-3) (hereinafter, also referred to as EPRS)

Example 1

An energy storage device (lithium ion secondary battery) shown in FIG. 1 was produced by methods as described below.

(1) Preparation of Positive Electrode $LiNi_{1/3}Co_{1/3}Mn_{1/3}O_2$ was used as a positive active material. Acetylene black was used as a conductive additive. PVDF was used as a binder. A positive paste was prepared by mixing and kneading N-methyl-2-pyrrolidone (NMP) as a solvent, the conductive additive so as to be 4.5% by mass, the binder so as to be 4.5% by mass and the positive active material so as to be 91% by mass. The prepared positive paste was applied, in an amount of 6.9 mg/cm², onto an aluminum foil having a thickness of 15 μm so that an applied portion of the aluminum foil was 83 mm wide and a portion not having the paste applied thereon (region not having the positive active material formed) was 11 mm wide. After drying the paste, the aluminum foil was compression-formed with a roll press so that a packing density of the active material in the positive composite layer was 2.48 g/mL, and vacuum-dried to remove a water content.

(2) Preparation of Negative Electrode

Non-graphitizable carbon having an average particle size D50 of 3.3 μm was used as a negative active material. Further, PVDF was used as a binder. A negative paste was prepared by mixing and kneading NMP as a solvent, a binder so as to be 7% by mass and a negative active material so as to be 93% by mass. The prepared negative paste was applied, in an amount of 3.3 mg/cm$^2$, onto a copper foil having a thickness of 8 μm so that an applied portion of the copper foil was 87 mm wide and a portion not having the paste applied thereon (region not having the negative active material formed) was 9 mm wide. After drying the paste, the copper foil was compression-formed with a roll press so that a packing density of the active material in the negative composite was 1.01 g/mL, and vacuum-dried to remove a water content.

(3) Preparation of Electrolyte Solution

As the electrolyte solution, an electrolyte solution prepared by the following method was used. That is, a solvent which is formed by mixing propylene carbonate, dimethyl carbonate and ethyl methyl carbonate so as to be respectively 30% by volume, 40% by volume and 30% by volume, was used as a nonaqueous solvent, and LiPF$_6$ was dissolved in this nonaqueous solvent so that a salt concentration was 1.2 mol/L. LiFOP, PEGLST and PRS were further added so that concentrations of LiFOP, PEGLST and PRS were respectively 0.3% by mass, 0.3% by mass and 0.1% by mass in the total mass of the electrolyte solution, and thereby, a liquid electrolyte solution was prepared.

(4) Placement of Electrode Assembly into Case

Using the above-mentioned positive electrode, negative electrode and electrolyte solution, a separator (polyethylene microporous membrane), and a case, a battery was produced by a common method.

That is, at first, a sheet-shaped article formed by superimposing the positive electrode and the negative electrode with the separator interposed therebetween, was wound. Thereafter, the wound electrode assembly was placed within a case main body of an aluminum prismatic container case as a case. Furthermore, the positive electrode and the negative electrode were electrically connected to two external terminals, respectively. Subsequently, the lid plate was attached to the case main body. Then, the electrolyte solution was injected into the case through an electrolyte solution filling hole provided in the lid plate of the case.

Finally, the case was hermetically sealed by sealing the electrolyte solution filling hole of the case.

Examples 2 to 311

As shown in Tables 1 to 24, lithium ion secondary batteries were produced in the same manner as in Example 1 except for changing the kinds and concentrations of the additives.

Incidentally, in Examples 308 to 310, batteries were produced in the same manner as in Example 1 except for using LiCoO$_2$, LiMn$_2$O$_4$, and LiNiO$_2$, respectively, as a positive active material.

Further, in Example 311, a battery was produced in the same manner as in Example 1 except for using graphite as a negative active material.

Comparative Examples 1 to 131

As shown in Tables 1 to 24, lithium ion secondary batteries were produced in the same manner as in Example 1 except for changing the kinds and concentrations of the additives.

Detailed constitutions of the lithium ion secondary batteries produced in Examples and Comparative Examples are shown in Tables 1 to 24.

A list of combinations of additives shown in Tables is described below.

| Table 1 | LiFOP, | PEGLST, | PRS |
|---|---|---|---|
| Table 2 | LiFOB, | PEGLST, | PRS |
| Table 3 | LiBOB, | PEGLST, | PRS |
| Table 4 | LiFOP, | GLST, PRS | |
| Table 5 | LiFOP, | PGLST, | PRS |
| Table 6 | LiFOP, | PEGLST, | MPRS |
| Table 7 | LiFOP, | PEGLST, | EPRS |
| Table 8 | LiFOP, | GLST, MPRS | |
| Table 9 | LiFOP, | GLST, EPRS | |
| Table 10 | LiFOP, | PGLST, | MPRS |
| Table 11 | LiFOP, | PGLST, | EPRS |
| Table 12 | LiFOB, | GLST, PRS | |
| Table 13 | LiFOB, | GLST, MPRS | |
| Table 14 | LiFOB, | GLST, EPRS | |
| Table 15 | LiFOB, | PGLST, | PRS |
| Table 16 | LiFOB, | PGLST, | MPRS |
| Table 17 | LiFOB, | PGLST, | EPRS |
| Table 18 | LiBOB, | GLST, PRS | |
| Table 19 | LiBOB, | GLST, MPRS | |
| Table 20 | LiBOB, | GLST, EPRS | |
| Table 21 | LiBOB, | PGLST, | PRS |
| Table 22 | LiBOB, | PGLST, | MPRS |
| Table 23 | LiBOB, | PGLST, | EPRS |
| Table 24 | Changes of the positive active material or the negative active material | | |

The lithium ion secondary batteries produced in Examples and Comparative Examples were evaluated in a way that is described below. That is, a power retention ratio after a storage test and a power retention ratio after a charge-discharge cycle test in each battery produced were examined.

<Initial Discharge Capacity Verification Test>

Using each battery, at first, an initial discharge capacity was measured by the following method.

That is, each battery was charged at a constant current of 5 A at 25° C. until a voltage reached 4.2 V and further charged at a constant voltage of 4.2 V for a predetermined time corresponding 3 hours in terms of a total charging time, and discharged at a constant current of 5 A under the condition of an end voltage of 2.4 V, and thereby, an initial discharge capacity was measured.

<Power Checking Test>

The battery of which discharge capacity had been checked was charged by 20% of the discharge capacity measured in the above-mentioned initial discharge capacity verification test to adjust an SOC (state of charge) of the battery to 20%. The battery was held at −10° C. for 4 hours, and thereafter the constant voltage discharge of 2.3 V was performed for 1 second, and a low temperature power P was calculated from a current value 1 second later.

<Storage Test>

The battery was charged at a constant current of 5 A until a voltage reached 4.03 V and further charged at a constant voltage of 4.03 V for a predetermined time corresponding 3 hours in terms of a total charging time, and a SOC (state of charge) of the battery was set at 80% and the battery was stored for 30 days (1 month) in a constant-temperature oven at 65° C. After the battery was held at 25° C. for 4 hours, the battery was discharged at a constant current of 5 A under the condition of an end voltage of 2.4 V, and then the above-mentioned capacity checking test and low temperature power checking test were performed. This storage test at 65° C. was repeated for 6 months. A power decrease ratio after the storage test was calculated from the formula of power retention ratio=PH2/PH1×100 in denoting a power before the storage test (initial power) by PH1 and a power after the 6 month-storage test (power after deterioration) by PH2.

<Charge-Discharge Cycle Test>

In order to determine test conditions of the charge-discharge cycle test, a battery of which SOC was adjusted to 50% was held at 55° C. for 4 hours, a constant current charge of 40 A was carried out until the SOC reached 80%, and then a constant current discharge of 40 A was carried out from an 80% SOC to a 20% SOC, and thereby, a charge voltage V80 in the 80% SOC and a discharge voltage V20 in the 20% SOC were determined.

The cycle test at 55° C. was performed at a constant current of 40 A, and continuously performed without setting a quiescent time, setting a cut-off voltage at the time of charging to V80 and setting a cut-off voltage at the time of discharging to V20. A cycle time was set to 3000 hours in total. After completion of the 3000-hour cycle test, the battery was held at 25° C. for 4 hours and the above-mentioned capacity checking test and low temperature power checking test were performed. A power decrease ratio after the cycle test was calculated from the formula of power retention ratio=PC2/PC1×100 in denoting a power before the cycle test (initial power) by PC1 and a power after the cycle test (power after deterioration) by PC2.

The results of the power retention ratio after storage test and the power retention ratio after cycle test, respectively determined in a way that is described above, are shown in Table 1 to Table 24.

TABLE 1

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 1 | LiFOP 0.3 | PEGLST 0.3 | PRS 0.1 | 375 | 345 | 92 | 376 | 342 | 91 |
| Example 2 | LiFOP 0.3 | PEGLST 0.5 | PRS 0.1 | 378 | 352 | 93 | 374 | 344 | 92 |
| Example 3 | LiFOP 0.3 | PEGLST 1.0 | PRS 0.1 | 380 | 361 | 95 | 381 | 362 | 95 |
| Example 4 | LiFOP 0.3 | PEGLST 0.3 | PRS 0.3 | 353 | 332 | 94 | 359 | 334 | 93 |
| Example 5 | LiFOP 0.3 | PEGLST 0.3 | PRS 0.5 | 340 | 320 | 94 | 341 | 321 | 94 |
| Example 6 | LiFOP 0.5 | PEGLST 0.3 | PRS 0.1 | 376 | 350 | 93 | 377 | 354 | 94 |
| Example 7 | LiFOP 0.5 | PEGLST 0.5 | PRS 0.1 | 372 | 350 | 94 | 370 | 344 | 93 |
| Example 8 | LiFOP 0.5 | PEGLST 0.5 | PRS 0.3 | 351 | 333 | 95 | 353 | 335 | 95 |
| Example 9 | LiFOP 0.5 | PEGLST 1.0 | PRS 0.1 | 370 | 352 | 95 | 368 | 350 | 95 |
| Example 10 | LiFOP 0.5 | PEGLST 0.3 | PRS 0.3 | 354 | 326 | 92 | 355 | 330 | 93 |
| Example 11 | LiFOP 0.5 | PEGLST 0.3 | PRS 0.5 | 332 | 309 | 93 | 329 | 303 | 92 |
| Example 12 | LiFOP 0.5 | PEGLST 0.5 | PRS 0.5 | 335 | 312 | 93 | 334 | 317 | 95 |
| Example 13 | LiFOP 0.5 | PEGLST 1.0 | PRS 0.5 | 339 | 322 | 95 | 340 | 320 | 94 |
| Example 14 | LiFOP 0.2 | PEGLST 0.3 | PRS 0.1 | 375 | 296 | 79 | 376 | 286 | 76 |
| Example 15 | LiFOP 0.2 | PEGLST 1.0 | PRS 0.5 | 339 | 278 | 82 | 336 | 276 | 82 |
| Example 16 | LiFOP 0.6 | PEGLST 0.3 | PRS 0.1 | 358 | 294 | 82 | 359 | 291 | 81 |
| Example 17 | LiFOP 0.6 | PEGLST 1.0 | PRS 0.5 | 342 | 274 | 80 | 340 | 272 | 80 |
| Example 18 | LiFOP 0.3 | PEGLST 0.2 | PRS 0.1 | 368 | 276 | 75 | 365 | 281 | 77 |
| Example 19 | LiFOP 0.3 | PEGLST 0.2 | PRS 0.5 | 343 | 261 | 76 | 340 | 258 | 76 |
| Example 20 | LiFOP 0.5 | PEGLST 1.1 | PRS 0.1 | 359 | 284 | 79 | 363 | 290 | 80 |
| Example 21 | LiFOP 0.5 | PEGLST 1.1 | PRS 0.5 | 332 | 269 | 81 | 335 | 268 | 80 |
| Comparative Example 1 | LiFOP 0.3 | PEGLST 0.3 | — | 382 | 294 | 77 | 379 | 288 | 76 |
| Comparative Example 2 | LiFOP 0.3 | PEGLST 1.0 | — | 378 | 295 | 78 | 380 | 300 | 79 |
| Example 22 | LiFOP 0.3 | PEGLST 0.3 | PRS 0.6 | 315 | 284 | 90 | 318 | 289 | 91 |
| Comparative Example 3 | LiFOP 0.5 | PEGLST 0.3 | — | 371 | 286 | 77 | 373 | 291 | 78 |
| Comparative Example 4 | LiFOP 0.5 | PEGLST 1.0 | — | 364 | 288 | 79 | 368 | 283 | 77 |
| Example 23 | LiFOP 0.5 | PEGLST 1.0 | PRS 0.6 | 320 | 298 | 93 | 322 | 296 | 92 |
| Comparative Example 5 | LiFOP 0.3 | — | PRS 0.1 | 375 | 270 | 72 | 373 | 272 | 73 |
| Comparative Example 6 | LiFOP 0.3 | — | PRS 0.5 | 338 | 260 | 77 | 340 | 258 | 76 |
| Comparative Example 7 | LiFOP 0.5 | — | PRS 0.1 | 372 | 272 | 73 | 370 | 266 | 72 |
| Comparative Example 8 | LiFOP 0.5 | — | PRS 0.5 | 339 | 258 | 76 | 337 | 253 | 75 |
| Comparative Example 9 | — | PEGLST 0.3 | PRS 0.1 | 374 | 273 | 73 | 372 | 268 | 72 |
| Comparative Example 10 | — | PEGLST 0.3 | PRS 0.5 | 336 | 249 | 74 | 338 | 254 | 75 |
| Comparative Example 11 | — | PEGLST 1.0 | PRS 0.1 | 377 | 268 | 71 | 371 | 263 | 71 |
| Comparative Example 12 | — | PEGLST 1.0 | PRS 0.5 | 342 | 260 | 76 | 343 | 264 | 77 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 15 | — | PEGLST 0.3 | — | 393 | 220 | 56 | 390 | 226 | 58 |
| Comparative Example 16 | — | PEGLST 1.0 | — | 397 | 246 | 62 | 396 | 242 | 61 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 2

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 24 | LiFOB 0.3 | PEGLST 0.3 | PRS 0.1 | 351 | 288 | 82 | 349 | 279 | 80 |
| Example 25 | LiFOB 0.3 | PEGLST 0.5 | PRS 0.1 | 353 | 286 | 81 | 355 | 288 | 81 |
| Example 26 | LiFOB 0.3 | PEGLST 1.0 | PRS 0.1 | 350 | 298 | 85 | 352 | 296 | 84 |
| Example 27 | LiFOB 0.3 | PEGLST 0.3 | PRS 0.3 | 324 | 266 | 82 | 322 | 267 | 83 |
| Example 28 | LiFOB 0.3 | PEGLST 0.3 | PRS 0.5 | 308 | 268 | 87 | 310 | 270 | 87 |
| Example 29 | LiFOB 0.5 | PEGLST 0.3 | PRS 0.1 | 355 | 298 | 84 | 353 | 293 | 83 |
| Example 30 | LiFOB 0.5 | PEGLST 0.5 | PRS 0.1 | 358 | 290 | 81 | 355 | 298 | 84 |
| Example 31 | LiFOB 0.5 | PEGLST 1.0 | PRS 0.1 | 356 | 303 | 85 | 352 | 296 | 84 |
| Example 32 | LiFOB 0.5 | PEGLST 0.3 | PRS 0.3 | 328 | 276 | 84 | 330 | 281 | 85 |
| Example 33 | LiFOB 0.5 | PEGLST 0.3 | PRS 0.5 | 310 | 273 | 88 | 306 | 266 | 87 |
| Example 34 | LiFOB 0.5 | PEGLST 0.5 | PRS 0.5 | 300 | 267 | 89 | 301 | 268 | 89 |
| Example 35 | LiFOB 0.5 | PEGLST 1.0 | PRS 0.5 | 303 | 267 | 88 | 304 | 268 | 88 |
| Example 36 | LiFOB 0.2 | PEGLST 0.3 | PRS 0.1 | 349 | 241 | 69 | 355 | 238 | 67 |
| Example 37 | LiFOB 0.2 | PEGLST 1.0 | PRS 0.5 | 312 | 225 | 72 | 310 | 220 | 71 |
| Example 38 | LiFOB 0.6 | PEGLST 0.3 | PRS 0.1 | 352 | 239 | 68 | 348 | 244 | 70 |
| Example 39 | LiFOB 0.6 | PEGLST 1.0 | PRS 0.5 | 307 | 218 | 71 | 312 | 228 | 73 |
| Comparative Example 20 | LiFOB 0.3 | — | PRS 0.1 | 342 | 212 | 62 | 345 | 217 | 63 |
| Comparative Example 21 | LiFOB 0.3 | — | PRS 0.5 | 308 | 219 | 71 | 302 | 211 | 70 |
| Comparative Example 22 | LiFOB 0.5 | — | PRS 0.1 | 343 | 216 | 63 | 340 | 214 | 63 |
| Comparative Example 23 | LiFOB 0.5 | — | PRS 0.5 | 301 | 211 | 70 | 305 | 223 | 73 |
| Comparative Example 24 | LiFOB 0.3 | PEGLST 0.3 | — | 369 | 240 | 65 | 368 | 243 | 66 |
| Comparative Example 25 | LiFOB 0.3 | PEGLST 1.0 | — | 365 | 230 | 63 | 360 | 227 | 63 |
| Comparative Example 26 | LiFOB 0.5 | PEGLST 0.3 | — | 366 | 234 | 64 | 363 | 225 | 62 |
| Comparative Example 27 | LiFOB 0.5 | PEGLST 1.0 | — | 367 | 228 | 62 | 364 | 237 | 65 |
| Comparative Example 9 | — | PEGLST 0.3 | PRS 0.1 | 370 | 259 | 70 | 372 | 264 | 71 |
| Comparative Example 10 | — | PEGLST 0.3 | PRS 0.5 | 336 | 249 | 74 | 338 | 254 | 75 |
| Comparative Example 11 | — | PEGLST 1.0 | PRS 0.1 | 371 | 263 | 71 | 371 | 260 | 70 |
| Comparative Example 12 | — | PEGLST 1.0 | PRS 0.5 | 342 | 260 | 76 | 343 | 264 | 77 |
| Comparative Example 28 | LiFOB 0.3 | — | — | 375 | 169 | 45 | 376 | 165 | 44 |
| Comparative Example 29 | LiFOB 0.5 | — | — | 374 | 165 | 44 | 377 | 162 | 43 |
| Comparative Example 30 | — | PEGLST 0.3 | — | 393 | 220 | 56 | 390 | 226 | 58 |
| Comparative Example 31 | — | PEGLST 1.0 | — | 397 | 246 | 62 | 396 | 242 | 61 |
| Comparative Example 32 | — | — | PRS 0.1 | 306 | 183 | 60 | 319 | 195 | 61 |
| Comparative Example 33 | — | — | PRS 0.5 | 248 | 171 | 69 | 265 | 180 | 68 |
| Comparative Example 19 | — | — | — | 382 | 145 | 38 | 389 | 136 | 35 |

TABLE 3

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 40 | LiBOB 0.3 | PEGLST 0.3 | PRS 0.1 | 333 | 283 | 85 | 328 | 282 | 86 |
| Example 41 | LiBOB 0.3 | PEGLST 0.5 | PRS 0.1 | 335 | 288 | 86 | 334 | 284 | 85 |
| Example 42 | LiBOB 0.3 | PEGLST 1.0 | PRS 0.1 | 333 | 293 | 88 | 331 | 285 | 86 |
| Example 43 | LiBOB 0.3 | PEGLST 0.3 | PRS 0.3 | 310 | 264 | 85 | 308 | 265 | 86 |
| Example 44 | LiBOB 0.3 | PEGLST 0.3 | PRS 0.5 | 293 | 264 | 90 | 291 | 265 | 91 |
| Example 45 | LiBOB 0.5 | PEGLST 0.3 | PRS 0.1 | 335 | 288 | 86 | 334 | 294 | 88 |
| Example 46 | LiBOB 0.5 | PEGLST 0.5 | PRS 0.1 | 339 | 298 | 88 | 336 | 296 | 88 |
| Example 47 | LiBOB 0.5 | PEGLST 1.0 | PRS 0.1 | 337 | 293 | 87 | 333 | 283 | 85 |
| Example 48 | LiBOB 0.5 | PEGLST 0.3 | PRS 0.3 | 313 | 272 | 87 | 315 | 271 | 86 |
| Example 49 | LiBOB 0.5 | PEGLST 0.3 | PRS 0.5 | 295 | 266 | 90 | 296 | 269 | 91 |
| Example 50 | LiBOB 0.5 | PEGLST 0.5 | PRS 0.5 | 293 | 267 | 91 | 295 | 266 | 90 |
| Example 51 | LiBOB 0.5 | PEGLST 1.0 | PRS 0.5 | 298 | 268 | 90 | 294 | 268 | 91 |
| Example 52 | LiBOB 0.2 | PEGLST 0.3 | PRS 0.1 | 327 | 245 | 75 | 333 | 246 | 74 |
| Example 53 | LiBOB 0.2 | PEGLST 1.0 | PRS 0.5 | 294 | 229 | 78 | 290 | 220 | 76 |
| Example 54 | LiBOB 0.6 | PEGLST 0.3 | PRS 0.1 | 333 | 246 | 74 | 330 | 244 | 74 |
| Example 55 | LiBOB 0.6 | PEGLST 1.0 | PRS 0.5 | 289 | 223 | 77 | 292 | 228 | 78 |
| Comparative Example 34 | LiBOB 0.3 | — | PRS 0.1 | 324 | 220 | 68 | 322 | 216 | 67 |
| Comparative Example 35 | LiBOB 0.3 | — | PRS 0.5 | 288 | 222 | 77 | 286 | 215 | 75 |
| Comparative Example 36 | LiBOB 0.5 | — | PRS 0.1 | 322 | 222 | 69 | 321 | 225 | 70 |
| Comparative Example 37 | LiBOB 0.5 | — | PRS 0.5 | 281 | 214 | 76 | 284 | 219 | 77 |
| Comparative Example 38 | LiBOB 0.3 | PEGLST 0.3 | — | 349 | 248 | 71 | 347 | 250 | 72 |
| Comparative Example 39 | LiBOB 0.3 | PEGLST 1.0 | — | 346 | 239 | 69 | 343 | 240 | 70 |
| Comparative Example 40 | LiBOB 0.5 | PEGLST 0.3 | — | 347 | 243 | 70 | 344 | 237 | 69 |
| Comparative Example 41 | LiBOB 0.5 | PEGLST 1.0 | — | 345 | 235 | 68 | 343 | 233 | 68 |
| Comparative Example 9 | — | PEGLST 0.3 | PRS 0.1 | 370 | 259 | 70 | 372 | 264 | 71 |
| Comparative Example 10 | — | PEGLST 0.3 | PRS 0.5 | 336 | 249 | 74 | 338 | 254 | 75 |
| Comparative Example 11 | — | PEGLST 1.0 | PRS 0.1 | 371 | 263 | 71 | 371 | 260 | 70 |

TABLE 3-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Comparative Example 12 | — | PEGLST 1.0 | PRS 0.5 | 342 | 260 | 76 | 343 | 264 | 77 |
| Comparative Example 42 | LiBOB 0.3 | — | — | 351 | 183 | 52 | 353 | 184 | 52 |
| Comparative Example 43 | LiBOB 0.5 | — | — | 348 | 188 | 54 | 346 | 190 | 55 |
| Comparative Example 15 | — | PEGLST 0.3 | — | 393 | 220 | 56 | 390 | 226 | 58 |
| Comparative Example 16 | — | PEGLST 1.0 | — | 397 | 246 | 62 | 396 | 242 | 61 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 4

|  | Chemical Formula 1 | Chemical Formula 2 | Chemical Formula 3 | Power before Storage Test [W] | Power after Storage Test [W] | Power Retention Ratio After Storage Test [%] | Power before Cycle Test [W] | Power after Cycle Test [W] | Power Retention Ratio after Cycle Test [%] |
|---|---|---|---|---|---|---|---|---|---|
| Example 56 | LiFOP 0.3 | GLST 0.3 | PRS 0.1 | 378 | 340 | 90 | 376 | 346 | 92 |
| Example 57 | LiFOP 0.3 | GLST 0.5 | PRS 0.1 | 375 | 341 | 91 | 374 | 348 | 93 |
| Example 58 | LiFOB 0.3 | GLST 1.0 | PRS 0.1 | 379 | 352 | 93 | 381 | 358 | 94 |
| Example 59 | LiFOP 0.3 | GLST 0.3 | PRS 0.3 | 355 | 327 | 92 | 359 | 330 | 92 |
| Example 60 | LiFOP 0.3 | GLST 0.3 | PRS 0.5 | 342 | 315 | 92 | 341 | 317 | 93 |
| Example 61 | LiFOP 0.5 | GLST 0.3 | PRS 0.1 | 377 | 351 | 93 | 377 | 347 | 92 |
| Example 62 | LiFOP 0.5 | GLST 0.5 | PRS 0.1 | 376 | 357 | 95 | 370 | 348 | 94 |
| Example 63 | LiFOP 0.5 | GLST 1.0 | PRS 0.1 | 371 | 345 | 93 | 368 | 342 | 93 |
| Example 64 | LiFOP 0.5 | GLST 0.3 | PRS 0.3 | 350 | 319 | 91 | 355 | 327 | 92 |
| Example 65 | LiFOP 0.5 | GLST 0.3 | PRS 0.5 | 335 | 312 | 93 | 329 | 309 | 94 |
| Example 66 | LiFOP 0.5 | GLST 0.5 | PRS 0.5 | 336 | 316 | 94 | 334 | 311 | 93 |
| Example 67 | LiFOP 0.5 | GLST 1.0 | PRS 0.5 | 333 | 310 | 93 | 340 | 323 | 95 |
| Example 68 | LiFOB 0.3 | GLST 0.2 | PRS 0.1 | 365 | 274 | 75 | 363 | 280 | 77 |
| Example 69 | LiFOP 0.3 | GLST 0.2 | PRS 0.5 | 341 | 259 | 76 | 342 | 260 | 76 |
| Example 70 | LiBOB 0.5 | GLST 1.1 | PRS 0.1 | 357 | 282 | 79 | 359 | 287 | 80 |
| Example 71 | LiFOP 0.5 | GLST 1.1 | PRS 0.5 | 330 | 267 | 81 | 333 | 266 | 80 |
| Comparative Example 44 | LiFOP 0.3 | GLST 0.3 | — | 383 | 294 | 77 | 380 | 285 | 75 |
| Comparative Example 45 | LiFOP 0.3 | GLST 1.0 | — | 376 | 295 | 78 | 377 | 290 | 77 |
| Comparative Example 46 | LiFOP 0.5 | GLST 1.0 | — | 369 | 286 | 77 | 367 | 283 | 77 |
| Comparative Example 47 | LiFOP 0.5 | GLST 1.0 | — | 370 | 288 | 79 | 373 | 291 | 78 |
| Comparative Example 48 | — | GLST 0.3 | PRS 0.1 | 372 | 257 | 69 | 371 | 256 | 69 |
| Comparative Example 49 | — | GLST 0.3 | PRS 0.5 | 333 | 250 | 75 | 334 | 254 | 76 |
| Comparative Example 50 | — | GLST 1.0 | PRS 0.1 | 374 | 258 | 69 | 375 | 259 | 69 |
| Comparative Example 51 | — | GLST 1.0 | PRS 0.5 | 345 | 259 | 75 | 346 | 256 | 74 |
| Comparative Example 5 | LiFOP 0.3 | — | PRS 0.1 | 375 | 270 | 72 | 373 | 272 | 73 |
| Comparative Example 6 | LiFOP 0.3 | — | PRS 0.5 | 338 | 260 | 77 | 340 | 258 | 76 |
| Comparative Example 7 | LiFOP 0.5 | — | PRS 0.1 | 372 | 272 | 73 | 370 | 266 | 72 |
| Comparative Example 8 | LiFOP 0.5 | — | PRS 0.5 | 339 | 258 | 76 | 337 | 253 | 75 |
| Comparative Example 52 | — | GLST 0.3 | — | 390 | 230 | 59 | 387 | 224 | 58 |
| Comparative Example 53 | — | GLST 1.0 | — | 392 | 235 | 60 | 395 | 237 | 60 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 5

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 72 | LiFOP 0.3 | PGLST 0.3 | PRS 0.1 | 376 | 342 | 91 | 374 | 337 | 90 |
| Example 73 | LiFOP 0.3 | PGLST 0.5 | PRS 0.1 | 376 | 338 | 90 | 375 | 345 | 92 |
| Example 74 | LiFOP 0.3 | PGLST 1.0 | PRS 0.1 | 377 | 351 | 93 | 379 | 356 | 94 |
| Example 75 | LiFOP 0.3 | PGLST 0.3 | PRS 0.3 | 353 | 328 | 93 | 355 | 330 | 93 |
| Example 76 | LiFOP 0.3 | PGLST 0.3 | PRS 0.5 | 340 | 316 | 93 | 339 | 308 | 91 |
| Example 77 | LiFOP 0.5 | PGLST 0.3 | PRS 0.1 | 375 | 345 | 92 | 375 | 345 | 92 |
| Example 78 | LiFOP 0.5 | PGLST 0.5 | PRS 0.1 | 374 | 352 | 94 | 373 | 343 | 92 |
| Example 79 | LiFOP 0.5 | PGLST 1.0 | PRS 0.1 | 373 | 351 | 94 | 370 | 344 | 93 |

TABLE 5-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 80 | LiFOP 0.5 | PGLST 0.3 | PRS 0.3 | 351 | 326 | 93 | 350 | 329 | 94 |
| Example 81 | LiFOP 0.5 | PGLST 0.3 | PRS 0.5 | 336 | 306 | 91 | 333 | 310 | 93 |
| Example 82 | LiFOP 0.5 | PGLST 0.5 | PRS 0.5 | 334 | 317 | 95 | 336 | 316 | 94 |
| Example 83 | LiFOP 0.5 | PGLST 1.0 | PRS 0.5 | 335 | 315 | 94 | 331 | 314 | 95 |
| Example 84 | LiFOP 0.3 | PGLST 0.2 | PRS 0.1 | 364 | 269 | 74 | 360 | 274 | 76 |
| Example 85 | LiFOP 0.3 | PGLST 0.2 | PRS 0.5 | 339 | 258 | 76 | 337 | 259 | 77 |
| Example 86 | LiFOP 0.5 | PGLST 1.1 | PRS 0.1 | 358 | 279 | 78 | 357 | 289 | 81 |
| Example 87 | LiFOP 0.5 | PGLST 1.1 | PRS 0.5 | 332 | 266 | 80 | 330 | 261 | 79 |
| Comparative Example 54 | LiFOP 0.3 | PGLST 0.3 | — | 380 | 294 | 78 | 381 | 290 | 76 |
| Comparative Example 55 | LiFOP 0.3 | PGLST 1.0 | — | 377 | 295 | 77 | 375 | 293 | 78 |
| Comparative Example 56 | LiFOP 0.5 | PGLST 1.0 | — | 367 | 286 | 79 | 365 | 277 | 76 |
| Comparative Example 57 | LiFOP 0.5 | PGLST 1.0 | — | 371 | 288 | 78 | 372 | 286 | 77 |
| Comparative Example 58 | — | PGLST 0.3 | PRS 0.1 | 370 | 252 | 68 | 372 | 260 | 70 |
| Comparative Example 59 | — | PGLST 0.3 | PRS 0.5 | 332 | 246 | 74 | 333 | 250 | 75 |
| Comparative Example 60 | — | PGLST 1 0 | PRS 0.1 | 376 | 259 | 69 | 374 | 262 | 70 |
| Comparative Example 61 | — | PGLST 1.0 | PRS 0.5 | 346 | 260 | 75 | 345 | 252 | 73 |
| Comparative Example 5 | LiFOP 0.3 | — | PRS 0.1 | 375 | 270 | 72 | 373 | 272 | 73 |
| Comparative Example 6 | LiFOP 0.3 | — | PRS 0.5 | 338 | 260 | 77 | 340 | 258 | 76 |
| Comparative Example 7 | LiFOP 0.5 | — | PRS 0.1 | 372 | 272 | 73 | 370 | 266 | 72 |
| Comparative Example 8 | LiFOP 0.5 | — | PRS 0.5 | 339 | 258 | 76 | 337 | 253 | 75 |
| Comparative Example 62 |  | PGLST 0.3 | — | 391 | 235 | 60 | 388 | 229 | 59 |
| Comparative Example 63 |  | PGLST 1.0 | — | 390 | 230 | 59 | 392 | 239 | 61 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 6

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 88 | LiFOP 0.3 | PEGLST 0.3 | MPRS 0.1 | 396 | 352 | 89 | 397 | 349 | 88 |
| Example 89 | LiFOP 0.3 | PEGLST 0.5 | MPRS 0.1 | 399 | 351 | 88 | 399 | 347 | 87 |
| Example 90 | LiFOP 0.3 | PEGLST 1.0 | MPRS 0.1 | 400 | 360 | 90 | 401 | 365 | 91 |
| Example 91 | LiFOP 0.3 | PEGLST 0.3 | MPRS 0.3 | 372 | 339 | 91 | 373 | 336 | 90 |
| Example 92 | LiFOP 0.3 | PEGLST 0.3 | MPRS 0.5 | 360 | 328 | 91 | 362 | 322 | 89 |
| Example 93 | LiFOP 0.5 | PEGLST 0.3 | MPRS 0.1 | 397 | 349 | 88 | 395 | 359 | 91 |
| Example 94 | LiFOP 0.5 | PEGLST 0.5 | MPRS 0.1 | 393 | 350 | 89 | 392 | 349 | 89 |
| Example 95 | LiFOP 0.5 | PEGLST 1.0 | MPRS 0.1 | 373 | 339 | 91 | 371 | 334 | 90 |
| Example 96 | LiFOP 0.5 | PEGLST 0.3 | MPRS 0.3 | 394 | 359 | 91 | 392 | 357 | 91 |
| Example 97 | LiFOP 0.5 | PEGLST 0.3 | MPRS 0.5 | 376 | 335 | 89 | 378 | 333 | 88 |
| Example 98 | LiFOP 0.5 | PEGLST 0.5 | MPRS 0.5 | 350 | 308 | 88 | 346 | 308 | 89 |
| Example 99 | LiFOP 0.5 | PEGLST 1.0 | MPRS 0.5 | 353 | 311 | 88 | 351 | 316 | 90 |
| Example 100 | LiFOP 0.3 | PEGLST 0.3 | MPRS 0.6 | 337 | 297 | 88 | 336 | 292 | 87 |
| Example 101 | LiFOP 0.5 | PEGLST 1.0 | MPRS 0.6 | 340 | 296 | 87 | 339 | 292 | 86 |
| Comparative Example 64 | LiFOP 0.3 | — | MPRS 0.1 | 398 | 275 | 69 | 396 | 269 | 68 |
| Comparative Example 65 | LiFOP 0.3 | — | MPRS 0.5 | 361 | 264 | 73 | 360 | 256 | 71 |
| Comparative Example 66 | LiFOP 0.5 | — | MPRS 0.1 | 394 | 280 | 71 | 394 | 272 | 69 |
| Comparative Example 67 | LiFOP 0.5 | — | MPRS 0.5 | 359 | 251 | 70 | 362 | 261 | 72 |
| Comparative Example 68 | — | PEGLST 0.3 | MPRS 0.1 | 395 | 265 | 67 | 397 | 262 | 66 |
| Comparative Example 69 | — | PEGLST 0.3 | MPRS 0.5 | 359 | 248 | 69 | 358 | 251 | 70 |
| Comparative Example 70 | — | PEGLST 1.0 | MPRS 0.1 | 399 | 279 | 70 | 395 | 284 | 72 |
| Comparative Example 71 | — | PEGLST 1.0 | MPRS 0.5 | 365 | 263 | 72 | 363 | 258 | 71 |
| Comparative Example 1 | LiFOP 0.3 | PEGLST 0.3 | — | 382 | 294 | 77 | 379 | 288 | 76 |
| Comparative Example 2 | LiFOP 0.3 | PEGLST 1.0 | — | 378 | 295 | 78 | 380 | 300 | 79 |
| Comparative Example 3 | LiFOP 0.5 | PEGLST 0.3 | — | 371 | 286 | 77 | 373 | 291 | 78 |
| Comparative Example 4 | LiFOP 0.5 | PEGLST 1.0 | — | 364 | 288 | 79 | 368 | 283 | 77 |
| Comparative Example 72 | — | — | MPRS 0.1 | 335 | 184 | 55 | 334 | 180 | 54 |
| Comparative Example 73 | — | — | MPRS 0.5 | 308 | 176 | 57 | 310 | 171 | 55 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 15 | — | PEGLST 0.3 | — | 393 | 220 | 56 | 390 | 226 | 58 |
| Comparative Example 16 | — | PEGLST 1.0 | — | 397 | 246 | 62 | 396 | 242 | 61 |
| Comparative Example 19 | — | — | — | 382 | 145 | 38 | 389 | 136 | 35 |

TABLE 7

| | Storage Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 102 | LiFOP 0.3 | PEGLST 0.3 | EPRS 0.1 | 404 | 335 | 83 | 402 | 330 | 82 |
| Example 103 | LiFOP 0.3 | PEGLST 0.5 | EPRS 0.1 | 400 | 336 | 84 | 399 | 339 | 85 |
| Example 104 | LiFOP 0.3 | PEGLST 1.0 | EPRS 0.1 | 402 | 346 | 86 | 403 | 343 | 85 |
| Example 105 | LiFOP 0.3 | PEGLST 0.3 | EPRS 0.3 | 383 | 329 | 86 | 383 | 329 | 86 |
| Example 106 | LiFOP 0.3 | PEGLST 0.3 | EPRS 0.5 | 369 | 314 | 85 | 372 | 312 | 84 |
| Example 107 | LiFOP 0.5 | PEGLST 0.5 | EPRS 0.1 | 399 | 335 | 84 | 400 | 348 | 87 |
| Example 108 | LiFOP 0.5 | PEGLST 0.5 | EPRS 0.1 | 397 | 345 | 87 | 395 | 344 | 87 |
| Example 109 | LiFOP 0.5 | PEGLST 1.0 | EPRS 0.1 | 379 | 326 | 86 | 381 | 324 | 85 |
| Example 110 | LiFOP 0.5 | PEGLST 0.3 | EPRS 0.3 | 399 | 343 | 86 | 396 | 341 | 86 |
| Example 111 | LiFOP 0.5 | PEGLST 0.3 | EPRS 0.5 | 384 | 326 | 85 | 385 | 323 | 84 |
| Example 112 | LiFOP 0.5 | PEGLST 0.5 | EPRS 0.5 | 357 | 303 | 85 | 357 | 303 | 85 |
| Example 113 | LiFOP 0.5 | PEGLST 1.0 | EPRS 0.5 | 361 | 303 | 84 | 359 | 309 | 86 |
| Example 114 | LiFOP 0.3 | PEGLST 0.3 | EPRS 0.6 | 346 | 291 | 84 | 344 | 286 | 83 |
| Example 115 | LiFOP 0.5 | PEGLST 1.0 | EPRS 0.6 | 348 | 289 | 83 | 347 | 281 | 81 |
| Comparative Example 74 | LiFOP 0.3 | — | EPRS 0.1 | 403 | 262 | 65 | 400 | 256 | 64 |
| Comparative Example 75 | LiFOP 0.3 | — | EPRS 0.5 | 368 | 254 | 69 | 369 | 247 | 67 |
| Comparative Example 76 | LiFOP 0.5 | — | EPRS 0.1 | 400 | 268 | 67 | 403 | 270 | 67 |
| Comparative Example 77 | LiFOP 0.5 | — | EPRS 0.5 | 368 | 243 | 66 | 368 | 250 | 68 |
| Comparative Example 78 | — | PEGLST 0.3 | EPRS 0.1 | 402 | 253 | 63 | 403 | 250 | 62 |
| Comparative Example 79 | — | PEGLST 0.3 | EPRS 0.5 | 366 | 238 | 65 | 367 | 242 | 66 |
| Comparative Example 80 | — | PEGLST 1.0 | EPRS 0.1 | 408 | 269 | 66 | 405 | 275 | 68 |
| Comparative Example 81 | — | PEGLST 1.0 | EPRS 0.5 | 374 | 254 | 68 | 374 | 251 | 67 |
| Comparative Example 1 | LiFOP 0.3 | PEGLST 0.3 | — | 382 | 294 | 77 | 379 | 288 | 76 |
| Comparative Example 2 | LiFOP 0.3 | PEGLST 1.0 | — | 378 | 295 | 78 | 380 | 300 | 79 |
| Comparative Example 3 | LiFOP 0.5 | PEGLST 0.3 | — | 371 | 286 | 77 | 373 | 291 | 78 |
| Comparative Example 4 | LiFOP 0.5 | PEGLST 1.0 | — | 364 | 288 | 79 | 368 | 283 | 77 |
| Comparative Example 82 | — | — | EPRS 0.1 | 348 | 171 | 49 | 345 | 179 | 52 |
| Comparative Example 83 | — | — | EPRS 0.5 | 315 | 161 | 51 | 310 | 164 | 53 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 15 | — | PEGLST 0.3 | — | 393 | 220 | 56 | 390 | 226 | 58 |
| Comparative Example 16 | — | PEGLST 1.0 | — | 397 | 246 | 62 | 396 | 242 | 61 |
| Comparative Example 19 | — | — | — | 382 | 145 | 38 | 389 | 136 | 35 |

TABLE 8

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 116 | LiFOP 0.3 | GLST 0.3 | MPRS 0.1 | 370 | 326 | 88 | 367 | 327 | 89 |
| Example 117 | LiFOP 0.3 | GLST 0.5 | MPRS 0.1 | 400 | 344 | 86 | 395 | 348 | 88 |
| Example 118 | LiFOP 0.3 | GLST 1.0 | MPRS 0.1 | 399 | 351 | 88 | 396 | 356 | 90 |
| Example 119 | LiFOP 0.3 | GLST 0.3 | MPRS 0.3 | 371 | 334 | 90 | 369 | 328 | 89 |
| Example 120 | LiFOP 0.3 | GLST 0.3 | MPRS 0.5 | 361 | 329 | 91 | 362 | 329 | 91 |
| Example 121 | LiFOP 0.5 | GLST 0.3 | MPRS 0.1 | 395 | 344 | 87 | 395 | 356 | 90 |
| Example 122 | LiFOP 0.5 | GLST 0.5 | MPRS 0.1 | 394 | 347 | 88 | 394 | 355 | 90 |
| Example 123 | LiFOP 0.5 | GLST 1.0 | MPRS 0.1 | 375 | 338 | 90 | 371 | 330 | 89 |
| Example 124 | LiFOP 0.5 | GLST 0.3 | MPRS 0.3 | 393 | 354 | 90 | 389 | 350 | 90 |
| Example 125 | LiFOP 0.5 | GLST 0.3 | MPRS 0.5 | 374 | 325 | 87 | 376 | 327 | 87 |
| Example 126 | LiFOP 0.5 | GLST 0.5 | MPRS 0.5 | 352 | 313 | 89 | 352 | 310 | 88 |
| Example 127 | LiFOP 0.5 | GLST 1.0 | MPRS 0.5 | 351 | 312 | 89 | 349 | 318 | 91 |
| Comparative Example 84 | — | GLST 0.3 | MPRS 0.1 | 389 | 257 | 66 | 390 | 261 | 67 |
| Comparative Example 85 | — | GLST 0.3 | MPRS 0.5 | 362 | 253 | 70 | 360 | 256 | 71 |
| Comparative Example 86 | — | GLST 1.0 | MPRS 0 1 | 390 | 265 | 68 | 391 | 270 | 69 |
| Comparative Example 87 | — | GLST 1.0 | MPRS 0.5 | 364 | 258 | 71 | 361 | 256 | 71 |
| Comparative Example 44 | LiFOP 0.3 | GLST 0.3 | — | 383 | 294 | 77 | 380 | 285 | 75 |
| Comparative Example 45 | LiFOP 0.3 | GLST 1.0 | — | 376 | 295 | 78 | 377 | 290 | 77 |
| Comparative Example 46 | LiFOP 0.5 | GLST 1.0 | — | 369 | 286 | 77 | 367 | 283 | 77 |
| Comparative Example 47 | LiFOP 0.5 | GLST 1.0 | — | 370 | 288 | 79 | 373 | 291 | 78 |
| Comparative Example 64 | LiFOP 0.3 | — | MPRS 0.1 | 398 | 275 | 69 | 396 | 269 | 68 |
| Comparative Example 65 | LiFOP 0.3 | — | MPRS 0.5 | 361 | 264 | 73 | 360 | 256 | 71 |
| Comparative Example 66 | LiFOP 0.5 | — | MPRS 0.1 | 394 | 280 | 71 | 394 | 272 | 69 |
| Comparative Example 67 | LiFOP 0.5 | — | MPRS 0.5 | 359 | 251 | 70 | 362 | 261 | 72 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 52 | — | GLST 0.3 | — | 390 | 230 | 59 | 387 | 224 | 58 |
| Comparative Example 53 | — | GLST 1.0 | — | 392 | 235 | 60 | 395 | 237 | 60 |
| Comparative Example 72 | — | — | MPRS 0.1 | 335 | 184 | 55 | 334 | 180 | 54 |

TABLE 8-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Comparative Example 73 | — | — | MPRS 0.5 | 308 | 176 | 57 | 310 | 171 | 55 |
| Comparative Example 19 | — | — | — | 382 | 145 | 38 | 389 | 136 | 35 |

TABLE 9

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 128 | LiFOP 0.3 | GLST 0.3 | EPRS 0.1 | 400 | 336 | 84 | 399 | 327 | 82 |
| Example 129 | LiFOP 0.3 | GLST 0.5 | EPRS 0.1 | 401 | 333 | 83 | 399 | 339 | 85 |
| Example 130 | LiFOP 0.3 | GLST 1.0 | EPRS 0.1 | 399 | 335 | 84 | 403 | 343 | 85 |
| Example 131 | LiFOP 0.3 | GLST 0.3 | EPRS 0.3 | 384 | 334 | 87 | 387 | 321 | 83 |
| Example 132 | LiFOP 0.3 | GLST 0.3 | EPRS 0.5 | 370 | 315 | 85 | 375 | 315 | 84 |
| Example 133 | LiFOP 0.5 | GLST 0.3 | EPRS 0.1 | 399 | 327 | 82 | 394 | 343 | 87 |
| Example 134 | LiFOP 0.5 | GLST 0.5 | EPRS 0.1 | 396 | 341 | 86 | 390 | 339 | 87 |
| Example 135 | LiFOP 0.5 | GLST 1.0 | EPRS 0.1 | 380 | 319 | 84 | 382 | 325 | 85 |
| Example 136 | LiFOP 0.5 | GLST 0.3 | EPRS 0.3 | 396 | 345 | 87 | 397 | 341 | 86 |
| Example 137 | LiFOP 0.5 | GLST 0.5 | EPRS 0.5 | 382 | 332 | 87 | 386 | 324 | 84 |
| Example 138 | LiFOP 0.5 | GLST 0.5 | EPRS 0.5 | 355 | 302 | 85 | 355 | 302 | 85 |
| Example 139 | LiFOP 0.5 | GLST 1.0 | EPRS 0.5 | 361 | 307 | 85 | 363 | 312 | 86 |
| Comparative Example 88 | — | GLST 0.3 | EPRS 0.1 | 402 | 261 | 65 | 399 | 251 | 63 |
| Comparative Example 89 | — | GLST 0.3 | EPRS 0.5 | 366 | 234 | 64 | 364 | 240 | 66 |
| Comparative Example 90 | — | GLST 1.0 | EPRS 0.1 | 408 | 261 | 64 | 405 | 263 | 65 |
| Comparative Example 91 | — | GLST 1.0 | EPRS 0.5 | 374 | 251 | 67 | 374 | 254 | 68 |
| Comparative Example 44 | LiFOP 0.3 | GLST 0.3 | — | 383 | 294 | 77 | 380 | 285 | 75 |
| Comparative Example 45 | LiFOP 0.3 | GLST 1.0 | — | 376 | 295 | 78 | 377 | 290 | 77 |
| Comparative Example 46 | LiFOP 0.5 | GLST 1.0 | — | 369 | 286 | 77 | 367 | 283 | 77 |
| Comparative Example 47 | LiFOP 0.5 | GLST 1.0 | — | 370 | 288 | 79 | 373 | 291 | 78 |
| Comparative Example 74 | LiFOP 0.3 | — | EPRS 0.1 | 403 | 262 | 65 | 400 | 256 | 64 |
| Comparative Example 75 | LiFOP 0.3 | — | EPRS 0.5 | 368 | 254 | 69 | 369 | 247 | 67 |
| Comparative Example 76 | LiFOP 0.5 | — | EPRS 0.1 | 400 | 268 | 67 | 403 | 270 | 67 |
| Comparative Example 77 | LiFOP 0.5 | — | EPRS 0.5 | 368 | 243 | 66 | 368 | 250 | 68 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 52 | — | GLST 0.3 | — | 390 | 230 | 59 | 387 | 224 | 58 |
| Comparative Example 53 | — | GLST 1.0 | — | 392 | 235 | 60 | 395 | 237 | 60 |
| Comparative Example 82 | — | — | EPRS 01 | 348 | 171 | 49 | 345 | 179 | 52 |
| Comparative Example 83 | — | — | EPRS 0.5 | 315 | 161 | 51 | 310 | 164 | 53 |
| Comparative Example 19 | — | — | — | 382 | 145 | 38 | 389 | 136 | 35 |

TABLE 10

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 140 | LiFOP 0.3 | PGLST 0.3 | MPRS 0.1 | 371 | 323 | 87 | 397 | 353 | 89 |
| Example 141 | LiFOP 0.3 | PGLST 0.5 | MPRS 0.1 | 400 | 356 | 89 | 399 | 351 | 88 |
| Example 142 | LiFOP 0.3 | PGLST 1.0 | MPRS 0.1 | 399 | 359 | 90 | 401 | 361 | 90 |
| Example 143 | LiFOP 0.3 | PGLST 0.3 | MPRS 0.3 | 373 | 332 | 89 | 373 | 339 | 91 |
| Example 144 | LiFOP 0.3 | PGLST 0.3 | MPRS 0.5 | 357 | 321 | 90 | 362 | 319 | 88 |
| Example 145 | LiFOP 0.5 | PGLST 0.3 | MPRs 0 1 | 395 | 352 | 89 | 395 | 356 | 90 |
| Example 146 | LiFOP 0.5 | PGLST 0.5 | MPRS 0.1 | 394 | 347 | 88 | 392 | 345 | 88 |
| Example 147 | LiFOP 0.5 | PGLST 0.1 | MPRS 0.1 | 370 | 337 | 91 | 371 | 338 | 91 |
| Example 148 | LiFOP 0.5 | PGLST 0.3 | MPRS 0.3 | 397 | 357 | 90 | 392 | 349 | 89 |
| Example 149 | LiFOP 0.5 | PGLST 0.3 | MPRS 0.5 | 376 | 331 | 88 | 378 | 329 | 87 |
| Example 150 | LiFOP 0.5 | PGLST 0.5 | MPRS 0.5 | 351 | 312 | 89 | 346 | 308 | 89 |
| Example 151 | LiFOP 0.5 | PGLST 1.0 | MPRS 0.5 | 354 | 315 | 89 | 351 | 319 | 91 |
| Comparative Example 92 | — | PGLST 0.3 | MPRS 0.1 | 392 | 259 | 66 | 397 | 266 | 67 |
| Comparative Example 93 | — | PGLST 0.3 | MPRS 0.5 | 357 | 243 | 68 | 360 | 252 | 70 |
| Comparative Example 94 | — | PGLST 1.0 | MPRS 0.1 | 389 | 268 | 69 | 392 | 270 | 69 |
| Comparative Example 95 | — | PGLST 1.0 | MPRS 0.5 | 364 | 258 | 71 | 362 | 261 | 72 |

TABLE 10-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Comparative Example 54 | LiFOP 0.3 | PGLST 0.3 | — | 380 | 294 | 78 | 381 | 290 | 76 |
| Comparative Example 55 | LiFOP 0.3 | PGLST 1.0 | — | 377 | 295 | 77 | 375 | 293 | 78 |
| Comparative Example 56 | LiFOP 0.5 | PGLST 1.0 | — | 367 | 286 | 79 | 365 | 277 | 76 |
| Comparative Example 57 | LiFOP 0.5 | PGLST 1.0 | — | 371 | 288 | 78 | 372 | 286 | 77 |
| Comparative Example 64 | LiFOP 0.3 | — | MPRS 0.1 | 398 | 275 | 69 | 396 | 269 | 68 |
| Comparative Example 65 | LiFOP 0.3 | — | MPRS 0.5 | 361 | 264 | 73 | 360 | 256 | 71 |
| Comparative Example 66 | LiFOP 0.5 | — | MPRS 0.1 | 394 | 280 | 71 | 394 | 272 | 69 |
| Comparative Example 67 | LiFOP 0.5 | — | MPRS 0.5 | 359 | 251 | 70 | 362 | 261 | 72 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 62 | — | PGLST 0.3 | — | 391 | 235 | 60 | 388 | 229 | 59 |
| Comparative Example 63 | — | PGLST 1.0 | — | 390 | 230 | 59 | 392 | 239 | 61 |
| Comparative Example 72 | — | — | MPRS 0.1 | 335 | 184 | 55 | 334 | 180 | 54 |
| Comparative Example 73 | — | — | MPRS 0.5 | 308 | 176 | 57 | 310 | 171 | 55 |
| Comparative Example 19 | — | — | — | 382 | 145 | 38 | 389 | 136 | 35 |

TABLE 11

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 152 | LiFOP 0.3 | PGLST 0.3 | EPRS 0.1 | 402 | 334 | 83 | 400 | 332 | 83 |
| Example 153 | LiFOP 0.3 | PGLST 0.5 | EPRS 0.1 | 399 | 339 | 85 | 401 | 337 | 84 |
| Example 154 | LiFOP 0.3 | PGLST 1.0 | EPRS 0.1 | 403 | 339 | 84 | 399 | 339 | 85 |
| Example 155 | LiFOP 0.3 | PGLST 0.3 | EPRS 0.3 | 381 | 328 | 86 | 383 | 314 | 82 |
| Example 156 | LiFOP 0.3 | PGLST 0.3 | EPRS 0.5 | 370 | 318 | 86 | 371 | 315 | 85 |
| Example 157 | LiFOP 0.5 | PGLST 0.3 | EPRS 0.1 | 396 | 333 | 84 | 400 | 344 | 86 |
| Example 158 | LiFOP 0.5 | PGLST 0.5 | EPRS 0.1 | 396 | 348 | 88 | 397 | 345 | 87 |
| Example 159 | LiFOP 0.5 | PGLST 1.0 | EPRS 0.1 | 380 | 331 | 87 | 383 | 329 | 86 |
| Example 160 | LiFOP 0.5 | PGLST 0.3 | EPRS 0.3 | 397 | 341 | 86 | 398 | 338 | 85 |
| Example 161 | LiFOP 0.5 | PGLST 0.3 | EPRS 0.5 | 384 | 323 | 84 | 382 | 325 | 85 |
| Example 162 | LiFOP 0.5 | PGLST 0.5 | EPRS 0.5 | 356 | 299 | 84 | 354 | 297 | 84 |
| Example 163 | LiFOP 0.5 | PGLST 1.0 | EPRS 0.5 | 363 | 309 | 85 | 360 | 302 | 84 |
| Comparative Example 96 | — | PGLST 0.3 | EPRS 0.1 | 400 | 256 | 64 | 403 | 250 | 62 |
| Comparative Example 97 | — | PGLST 0.3 | EPRS 0.5 | 367 | 231 | 63 | 364 | 240 | 66 |
| Comparative Example 98 | — | PGLST 1.0 | EPRS 0.1 | 405 | 267 | 66 | 400 | 268 | 67 |
| Comparative Example 99 | — | PGLST 1.0 | EPRS 0.5 | 372 | 249 | 67 | 374 | 247 | 66 |
| Comparative Example 54 | LiFOP 0.3 | PGLST 0.3 | — | 380 | 294 | 78 | 381 | 290 | 76 |
| Comparative Example 55 | LiFOP 0.3 | PGLST 1.0 | — | 377 | 295 | 77 | 375 | 293 | 78 |
| Comparative Example 56 | LiFOP 0.5 | PGLST 1.0 | — | 367 | 286 | 79 | 365 | 277 | 76 |
| Comparative Example 57 | LiFOP 0.5 | PGLST 1.0 | — | 371 | 288 | 78 | 372 | 286 | 77 |
| Comparative Example 74 | LiFOP 0.3 | — | EPRS 0.1 | 403 | 262 | 65 | 400 | 256 | 64 |
| Comparative Example 75 | LiFOP 0.3 | — | EPRS 0.5 | 368 | 254 | 69 | 369 | 247 | 67 |
| Comparative Example 76 | LiFOP 0.5 | — | EPRS 0.1 | 400 | 268 | 67 | 403 | 270 | 67 |
| Comparative Example 77 | LiFOP 0.5 | — | EPRS 0.5 | 368 | 243 | 66 | 368 | 250 | 68 |
| Comparative Example 13 | LiFOP 0.3 | — | — | 388 | 225 | 58 | 390 | 215 | 55 |
| Comparative Example 14 | LiFOP 0.5 | — | — | 385 | 227 | 59 | 382 | 218 | 57 |
| Comparative Example 62 | — | PGLST 0.3 | — | 391 | 235 | 60 | 388 | 229 | 59 |
| Comparative Example 63 | — | PGLST 1.0 | — | 390 | 230 | 59 | 392 | 239 | 61 |
| Comparative Example 82 | — | — | EPRS 0.1 | 348 | 171 | 49 | 345 | 179 | 52 |
| Comparative Example 83 | — | — | EPRS 0.5 | 315 | 161 | 51 | 310 | 164 | 53 |
| Comparative Example 19 | — | — | — | 382 | 145 | 38 | 389 | 136 | 35 |

TABLE 12

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 164 | LiFOB 0.3 | GLST 0.3 | PRS 0.1 | 353 | 297 | 84 | 347 | 281 | 81 |
| Example 165 | LiFOB 0.3 | GLST 0.5 | PRS 0.1 | 351 | 281 | 80 | 354 | 283 | 80 |
| Example 166 | LiFOB 0.3 | GLST 1.0 | PRS 0.1 | 349 | 300 | 86 | 351 | 288 | 82 |
| Example 167 | LiFOB 0.3 | GLST 0.3 | PRS 0.3 | 325 | 267 | 82 | 323 | 271 | 84 |
| Example 168 | LiFOB 0.3 | GLST 0.3 | PRS 0.5 | 306 | 263 | 86 | 311 | 264 | 85 |
| Example 169 | LiFOB 0.5 | GLST 0.3 | PRS 0.1 | 357 | 296 | 83 | 354 | 297 | 84 |
| Example 170 | LiFOB 0.5 | GLST 0.5 | PRS 0.1 | 354 | 290 | 82 | 352 | 292 | 83 |
| Example 171 | LiFOB 0.5 | GLST 1.0 | PRS 0.1 | 355 | 298 | 84 | 352 | 292 | 83 |
| Example 172 | LiFOB 0.5 | GLST 0.3 | PRS 0.3 | 329 | 280 | 85 | 332 | 282 | 85 |
| Example 173 | LiFOB 0.5 | GLST 0.3 | PRS 0.5 | 311 | 267 | 86 | 311 | 264 | 85 |
| Example 174 | LiFOB 0.5 | GLST 0.5 | PRS 0.5 | 309 | 263 | 85 | 309 | 266 | 86 |
| Example 175 | LiFOB 0.5 | GLST 1.0 | PRS 0.5 | 312 | 268 | 86 | 313 | 269 | 86 |
| Comparative Example 100 | LiFOB 0.3 | GLST 0.3 | — | 361 | 238 | 66 | 367 | 239 | 65 |
| Comparative Example 101 | LiFOB 0.3 | GLST 1.0 | — | 363 | 232 | 64 | 364 | 233 | 64 |
| Comparative Example 102 | LiFOB 0.5 | GLST 0.3 | — | 365 | 230 | 63 | 361 | 227 | 63 |
| Comparative Example 103 | LiFOB 0.5 | GLST 1.0 | — | 366 | 223 | 61 | 365 | 234 | 64 |
| Comparative Example 20 | LiFOB 0.3 | — | PRS 0.1 | 342 | 212 | 62 | 345 | 217 | 63 |
| Comparative Example 21 | LiFOB 0.3 | — | PRS 0.5 | 308 | 219 | 71 | 302 | 211 | 70 |
| Comparative Example 22 | LiFOB 0.5 | — | PRS 0.1 | 343 | 216 | 63 | 340 | 214 | 63 |
| Comparative Example 23 | LiFOB 0.5 | — | PRS 0.5 | 301 | 211 | 70 | 305 | 223 | 73 |
| Comparative Example 48 | — | GLST 0.3 | PRS 0.1 | 372 | 257 | 69 | 371 | 256 | 69 |
| Comparative Example 49 | — | GLST 0.3 | PRS 0.5 | 333 | 250 | 75 | 334 | 254 | 76 |
| Comparative Example 50 | — | GLST 1.0 | PRS 0.1 | 374 | 258 | 69 | 375 | 259 | 69 |
| Comparative Example 51 | — | GLST 1.0 | PRS 0.5 | 345 | 259 | 75 | 346 | 256 | 74 |
| Comparative Example 28 | LiFOB 0.3 | — | — | 375 | 169 | 45 | 376 | 165 | 44 |
| Comparative Example 29 | LiFOB 0.5 | — | — | 374 | 165 | 44 | 377 | 162 | 43 |
| Comparative Example 52 | — | GLST 0.3 | — | 390 | 230 | 59 | 387 | 224 | 58 |
| Comparative Example 53 | — | GLST 1.0 | — | 392 | 235 | 60 | 395 | 237 | 60 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 13

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 176 | LiFOB 0.3 | GLST 0.3 | MPRS 0.1 | 370 | 296 | 80 | 373 | 295 | 79 |
| Example 177 | LiFOB 0.3 | GLST 0.5 | MPRS 0.1 | 370 | 292 | 79 | 371 | 297 | 80 |
| Example 178 | LiFOB 0.3 | GLST 1.0 | MPRS 0.1 | 367 | 308 | 84 | 369 | 310 | 84 |
| Example 179 | LiFOB 0.3 | GLST 0.3 | MPRS 0.3 | 340 | 272 | 80 | 342 | 284 | 83 |
| Example 180 | LiFOB 0.3 | GLST 0.3 | MPRS 0.5 | 330 | 271 | 82 | 330 | 274 | 83 |
| Example 181 | LiFOB 0.5 | GLST 0.3 | MPRS 0.1. | 375 | 304 | 81 | 372 | 309 | 83 |
| Example 182 | LiFOB 0.5 | GLST 0.5 | MPRS 0.1 | 373 | 298 | 80 | 370 | 296 | 80 |
| Example 183 | LiFOB 0.5 | GLST 1.0 | MPRS 0.1 | 372 | 301 | 81 | 372 | 305 | 82 |
| Example 184 | LiFOB 0.5 | GLST 0.3 | MPRS 0.3 | 344 | 279 | 81 | 349 | 282 | 81 |
| Example 185 | LiFOB 0.5 | GLST 0.3 | MPRS 0.5 | 328 | 269 | 82 | 328 | 276 | 84 |
| Example 186 | LiFOB 0.5 | GLST 0.5 | MPRS 0.5 | 329 | 273 | 83 | 330 | 277 | 84 |
| Example 187 | LiFOB 0.5 | GLST 1.0 | MPRS 0.5 | 333 | 273 | 82 | 331 | 275 | 83 |
| Comparative Example 104 | LiFOB 0.3 | — | MPRS 0.1 | 382 | 214 | 56 | 380 | 217 | 57 |
| Comparative Example 105 | LiFOB 0.3 | — | MPRS 0.5 | 348 | 226 | 65 | 352 | 232 | 66 |
| Comparative Example 106 | LiFOB 0.5 | — | MPRS 0.1 | 379 | 220 | 58 | 381 | 217 | 57 |
| Comparative Example 107 | LiFOB 0.5 | — | MPRS 0.5 | 345 | 221 | 64 | 344 | 224 | 65 |
| Comparative Example 100 | LiFOB 0.3 | GLST 0.3 | — | 361 | 238 | 66 | 367 | 239 | 65 |
| Comparative Example 101 | LiFOB 0.3 | GLST 1.0 | — | 363 | 232 | 64 | 364 | 233 | 64 |
| Comparative Example 102 | LiFOB 0.5 | GLST 0.3 | — | 365 | 230 | 63 | 361 | 227 | 63 |
| Comparative Example 103 | LiFOB 0.5 | GLST 1.0 | — | 366 | 223 | 61 | 365 | 234 | 64 |
| Comparative Example 84 | — | GLST 0.3 | MPRS 0.1 | 389 | 257 | 66 | 390 | 261 | 67 |
| Comparative Example 85 | — | GLST 0.3 | MPRS 0.5 | 362 | 253 | 70 | 360 | 256 | 71 |
| Comparative Example 86 | — | GLST 1.0 | MPRS 0.1 | 390 | 265 | 68 | 391 | 270 | 69 |
| Comparative Example 87 | — | GLST 1.0 | MPRS 0.5 | 364 | 258 | 71 | 361 | 256 | 71 |
| Comparative Example 28 | LiFOB 0.3 | — | — | 375 | 169 | 45 | 376 | 165 | 44 |
| Comparative Example 29 | LiFOB 0.5 | — | — | 374 | 165 | 44 | 377 | 162 | 43 |
| Comparative Example 52 | — | GLST 0.3 | — | 390 | 230 | 59 | 387 | 224 | 58 |

TABLE 13-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
| --- | --- | --- | --- | --- | --- | --- | --- | --- | --- |
| Comparative Example 53 | — | GLST 1.0 | — | 392 | 235 | 60 | 395 | 237 | 60 |
| Comparative Example 72 | — | — | MPRS 0.1 | 335 | 184 | 55 | 334 | 180 | 54 |
| Comparative Example 73 | — | — | MPRS 0.5 | 308 | 176 | 57 | 310 | 171 | 55 |
| Comparative Example 19 | — | — | — | 382 | 145 | 38 | 389 | 136 | 35 |

TABLE 14

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
| --- | --- | --- | --- | --- | --- | --- | --- | --- | --- |
| Example 188 | LiFOB 0.3 | GLST 0.3 | EPRS 0.1 | 379 | 296 | 78 | 382 | 294 | 77 |
| Example 189 | LiFOB 0.3 | GLST 0.5 | EPRS 0.1 | 377 | 291 | 77 | 375 | 289 | 77 |
| Example 190 | LiFOB 0.3 | GLST 1 0 | EPRS 0.1 | 375 | 308 | 82 | 373 | 306 | 82 |
| Example 191 | LiFOB 0.3 | GLST 0.3 | EPRS 0.3 | 349 | 276 | 79 | 352 | 278 | 79 |
| Example 192 | LiFOB 0.3 | GLST 0.3 | EPRS 0.5 | 329 | 263 | 80 | 333 | 266 | 80 |
| Example 193 | LiFOB 0.5 | GLST 0.3 | EPRS 0.1 | 384 | 303 | 79 | 383 | 303 | 79 |
| Example 194 | LiFOB 0.5 | GLST 0.5 | EPRS 0.1 | 381 | 301 | 79 | 378 | 299 | 79 |
| Example 195 | LiFOB 0.5 | GLST 1.0 | EPRS 0.1 | 382 | 305 | 80 | 379 | 303 | 80 |
| Example 196 | LiFOB 0.5 | GLST 0.3 | EPRS 0.3 | 354 | 283 | 80 | 356 | 285 | 80 |
| Example 197 | LiFOB 0.5 | GLST 0.3 | EPRS 0.5 | 334 | 274 | 82 | 330 | 274 | 83 |
| Example 198 | LiFOB 0.5 | GLST 0.5 | EPRS 0.5 | 332 | 276 | 83 | 330 | 271 | 82 |
| Example 199 | LiFOB 0.5 | GLST 1.0 | EPRS 0.5 | 335 | 275 | 82 | 329 | 270 | 82 |
| Comparative Example 108 | LiFOB 0.3 | — | EPRS 0.1 | 388 | 213 | 55 | 395 | 221 | 56 |
| Comparative Example 109 | LiFOB 0.3 | — | EPRS 0.5 | 390 | 254 | 65 | 393 | 259 | 66 |
| Comparative Example 110 | LiFOB 0.5 | — | EPRS 0.1 | 392 | 224 | 57 | 389 | 230 | 59 |
| Comparative Example 111 | LiFOB 0.5 | — | EPRS 0.5 | 393 | 252 | 64 | 390 | 254 | 65 |
| Comparative Example 100 | LiFOB 0.3 | GLST 0.3 | — | 361 | 238 | 66 | 367 | 239 | 65 |
| Comparative Example 101 | LiFOB 0.3 | GLST 1.0 | — | 363 | 232 | 64 | 364 | 233 | 64 |
| Comparative Example 102 | LiFOB 0.5 | GLST 0.3 | — | 365 | 230 | 63 | 361 | 227 | 63 |
| Comparative Example 103 | LiFOB 0.5 | GLST 1.0 | — | 366 | 223 | 61 | 365 | 234 | 64 |
| Comparative Example 88 | — | GLST 0.3 | EPRS 0.1 | 402 | 261 | 65 | 399 | 251 | 63 |
| Comparative Example 89 | — | GLST 0.3 | EPRS 0.5 | 366 | 234 | 64 | 364 | 240 | 66 |
| Comparative Example 90 | — | GLST 1 0 | EPRS 0.1 | 408 | 261 | 64 | 405 | 263 | 65 |
| Comparative Example 91 | — | GLST 1.0 | EPRS 0.5 | 374 | 251 | 67 | 374 | 254 | 68 |
| Comparative Example 28 | LiFOB 0.3 | — | — | 375 | 169 | 45 | 376 | 165 | 44 |
| Comparative Example 29 | LiFOB 0.5 | — | — | 374 | 165 | 44 | 377 | 162 | 43 |
| Comparative Example 52 | — | GLST 0.3 | — | 390 | 230 | 59 | 387 | 224 | 58 |
| Comparative Example 53 | — | GLST 1.0 | — | 392 | 235 | 60 | 395 | 237 | 60 |
| Comparative Example 82 | — | — | EPRS 0.1 | 348 | 171 | 49 | 345 | 179 | 52 |
| Comparative Example 83 | — | — | EPRS 0.5 | 315 | 161 | 51 | 310 | 164 | 53 |
| Comparative Example 19 | — | — | — | 382 | 145 | 38 | 389 | 136 | 35 |

TABLE 15

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
| --- | --- | --- | --- | --- | --- | --- | --- | --- | --- |
| Example 200 | LiFOB 0,3 | PGLST 0.3 | PRS 0.1 | 354 | 290 | 82 | 346 | 280 | 81 |
| Example 201 | LiFOB 0.3 | PGLST 0.5 | PRS 0.1 | 352 | 285 | 81 | 350 | 284 | 81 |
| Example 202 | LiFOB 0.3 | PGLST 1.0 | PRS 0.1 | 347 | 295 | 85 | 352 | 292 | 83 |
| Example 203 | LiFOB 0.3 | PGLST 0.3 | PRS 0.3 | 326 | 271 | 83 | 327 | 275 | 84 |
| Example 204 | LiFOB 0.3 | PGLST 0.3 | PRS 0.5 | 312 | 275 | 88 | 310 | 276 | 89 |
| Example 205 | LiFOB 0.5 | PGLST 0.3 | PRS 0.1 | 356 | 292 | 82 | 352 | 292 | 83 |
| Example 206 | LiFOB 0.5 | PGLST 0.5 | PRS 0.1 | 355 | 295 | 83 | 354 | 297 | 84 |
| Example 207 | LiFOB 0.5 | PGLST 1.0 | PRS 0.1 | 356 | 303 | 85 | 351 | 295 | 84 |
| Example 208 | LiFOB 0,5 | PGLST 0.3 | PRS 0.3 | 330 | 277 | 84 | 331 | 275 | 83 |
| Example 209 | LiFOB 0.5 | PGLST 0.3 | PRS 0.5 | 309 | 272 | 88 | 312 | 275 | 88 |

TABLE 15-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 210 | LiFOB 0.5 | PGLST 0.5 | PRS 0.5 | 313 | 272 | 87 | 314 | 279 | 89 |
| Example 211 | LiFOB 0.5 | PGLST 1.0 | PRS 0.5 | 311 | 274 | 88 | 312 | 275 | 88 |
| Comparative Example 112 | LiFOB 0.3 | PGLST 0.3 | — | 359 | 241 | 67 | 367 | 231 | 63 |
| Comparative Example 113 | LiFOB 0.3 | PGLST 1.0 | — | 364 | 240 | 66 | 364 | 240 | 66 |
| Comparative Example 114 | LiFOB 0.5 | PGLST 0.3 | — | 366 | 238 | 65 | 361 | 224 | 62 |
| Comparative Example 115 | LiFOB 0.5 | PGLST 1.0 | — | 365 | 230 | 63 | 365 | 234 | 64 |
| Comparative Example 20 | LiFOB 0.3 | — | PRS 0.1 | 342 | 212 | 62 | 345 | 217 | 63 |
| Comparative Example 21 | LiFOB 0.3 | — | PRS 0.5 | 308 | 219 | 71 | 302 | 211 | 70 |
| Comparative Example 22 | LiFOB 0.5 | — | PRS 0.1 | 343 | 216 | 63 | 340 | 214 | 63 |
| Comparative Example 23 | LiFOB 0.5 | — | PRS 0.5 | 301 | 211 | 70 | 305 | 223 | 73 |
| Comparative Example 58 | — | PGLST 0.3 | PRS 0.1 | 370 | 252 | 68 | 372 | 260 | 70 |
| Comparative Example 59 | — | PGLST 0.3 | PRS 0.5 | 332 | 246 | 74 | 333 | 250 | 75 |
| Comparative Example 60 | — | PGLST 1 0 | PRS 0.1 | 376 | 259 | 69 | 374 | 262 | 70 |
| Comparative Example 61 | — | PGLST 1.0 | PRS 0.5 | 346 | 260 | 75 | 345 | 252 | 73 |
| Comparative Example 28 | LiFOB 0.3 | — | — | 375 | 169 | 45 | 376 | 165 | 44 |
| Comparative Example 29 | LiFOB 0.5 | — | — | 374 | 165 | 44 | 377 | 162 | 43 |
| Comparative Example 62 | — | PGLST 0.3 | — | 391 | 235 | 60 | 388 | 229 | 59 |
| Comparative Example 63 | — | PGLST 1.0 | — | 390 | 230 | 59 | 392 | 239 | 61 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 16

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 212 | LiFOB 0.3 | PGLST 0.3 | MPRS 0.1 | 370 | 292 | 79 | 373 | 298 | 80 |
| Example 213 | LiFOB 0.3 | PGLST 0.5 | MPRS 0.1 | 372 | 298 | 80 | 371 | 293 | 79 |
| Example 214 | LiFOB 0.3 | PGLST 1.0 | MPRS 0.1 | 365 | 299 | 82 | 370 | 310 | 84 |
| Example 215 | LiFOB 0.3 | PGLST 0.3 | MPRS 0.3 | 346 | 280 | 81 | 342 | 287 | 84 |
| Example 216 | LiFOB 0.3 | PGLST 0.3 | MPRS 0.5 | 332 | 269 | 81 | 330 | 271 | 82 |
| Example 217 | LiFOB 0.5 | PGLST 0.3 | MPRS 0.1 | 371 | 304 | 82 | 370 | 307 | 83 |
| Example 218 | LiFOB 0.5 | PGLST 0.5 | MPRS 0.1 | 370 | 300 | 81 | 372 | 301 | 81 |
| Example 219 | LiFOB 0.5 | PGLST 1.0 | MPRS 0.1 | 371 | 297 | 80 | 372 | 305 | 82 |
| Example 220 | LiFOB 0.5 | PGLST 0.3 | MPRS 0.3 | 348 | 282 | 81 | 348 | 282 | 81 |
| Example 221 | LiFOB 0.5 | PGLST 0.3 | MFRS 0.5 | 326 | 271 | 83 | 328 | 272 | 83 |
| Example 222 | LiFOB 0.5 | PGLST 0.5 | MPRS 0.5 | 328 | 272 | 83 | 330 | 271 | 82 |
| Example 223 | LiFOB 0.5 | PGLST 1.0 | MPRS 0.5 | 333 | 273 | 82 | 331 | 275 | 83 |
| Comparative Example 112 | LiFOB 0.3 | PGLST 0.3 | — | 359 | 241 | 67 | 367 | 231 | 63 |
| Comparative Example 113 | LiFOB 0.3 | PGLST 1.0 | — | 364 | 240 | 66 | 364 | 240 | 66 |
| Comparative Example 114 | LiFOB 0.5 | PGLST 0.3 | — | 366 | 238 | 65 | 361 | 224 | 62 |
| Comparative Example 115 | LiFOB 0.5 | PGLST 1.0 | — | 365 | 230 | 63 | 365 | 234 | 64 |
| Comparative Example 104 | LiFOB 0.3 | — | MPRS 0.1 | 382 | 214 | 56 | 380 | 217 | 57 |
| Comparative Example 105 | LiFOB 0.3 | — | MPRS 0.5 | 348 | 226 | 65 | 352 | 232 | 66 |
| Comparative Example 106 | LiFOB 0.5 | — | MPRS 0.1 | 379 | 220 | 58 | 381 | 217 | 57 |
| Comparative Example 107 | LiFOB 0.5 | — | MPRS 0.5 | 345 | 221 | 64 | 344 | 224 | 65 |
| Comparative Example 92 | — | PGLST 0.3 | MPRS 0.1 | 392 | 259 | 66 | 397 | 266 | 67 |
| Comparative Example 93 | — | PGLST 0.3 | MPRS 0.5 | 357 | 243 | 68 | 360 | 252 | 70 |
| Comparative Example 94 | — | PGLST 1.0 | MPRS 0.1 | 389 | 268 | 69 | 392 | 270 | 69 |
| Comparative Example 95 | — | PGLST 1.0 | MPRS 0.5 | 364 | 258 | 71 | 362 | 261 | 72 |
| Comparative Example 28 | LiFOB 0.3 | — | — | 375 | 169 | 45 | 376 | 165 | 44 |
| Comparative Example 29 | LiFOB 0.5 | — | — | 374 | 165 | 44 | 377 | 162 | 43 |
| Comparative Example 62 | — | PGLST 0.3 | — | 391 | 235 | 60 | 388 | 229 | 59 |
| Comparative Example 63 | — | PGLST 1.0 | — | 390 | 230 | 59 | 392 | 239 | 61 |
| Comparative Example 72 | — | — | MPRS 0.1 | 335 | 184 | 55 | 334 | 180 | 54 |
| Comparative Example 73 | — | — | MPRS 0.5 | 308 | 176 | 57 | 310 | 171 | 55 |
| Comparative Example 19 | — | — | — | 382 | 145 | 38 | 389 | 136 | 35 |

TABLE 17

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 224 | LiFOB 0.3 | PGLST 0.3 | EPRS 0.1 | 381 | 293 | 77 | 381 | 290 | 76 |
| Example 225 | LiFOB 0.3 | PGLST 0.5 | EPRS 0.1 | 378 | 295 | 78 | 376 | 286 | 76 |
| Example 226 | LiFOB 0.3 | PGLST 1.0 | EPRS 0.1 | 373 | 302 | 81 | 374 | 310 | 83 |
| Example 227 | LiFOB 0.3 | PGLST 0.3 | EPRS 0.3 | 350 | 280 | 80 | 353 | 282 | 80 |
| Example 228 | LiFOB 0.3 | PGLST 0.3 | EPRS 0.5 | 330 | 274 | 83 | 335 | 275 | 82 |
| Example 229 | LiFOB 0.5 | PGLST 0.3 | EPRS 0.1 | 383 | 302 | 79 | 381 | 305 | 80 |
| Example 230 | LiFOB 0.5 | PGLST 0.5 | EPRS 0.1 | 382 | 305 | 80 | 376 | 297 | 79 |
| Example 231 | LiFOB 0.5 | PGLST 1.0 | EPRS 0.1 | 383 | 302 | 79 | 377 | 305 | 81 |
| Example 232 | LiFOB 0.5 | PGLST 0.3 | EPRS 0.3 | 355 | 284 | 80 | 351 | 277 | 79 |
| Example 233 | LiFOB 0.5 | PGLST 0.3 | EPRS 0.5 | 332 | 276 | 83 | 331 | 278 | 84 |
| Example 234 | LiFOB 0.5 | PGLST 0.5 | EPRS 0.5 | 327 | 275 | 84 | 330 | 274 | 83 |
| Example 235 | LiFOB 0.5 | PGLST 1.0 | EPRS 0.5 | 326 | 274 | 84 | 331 | 275 | 83 |
| Comparative Example 112 | LiFOB 0.3 | PGLST 0.3 | — | 359 | 241 | 67 | 367 | 231 | 63 |
| Comparative Example 113 | LiFOB 0.3 | PGLST 1.0 | — | 364 | 240 | 66 | 364 | 240 | 66 |
| Comparative Example 114 | LiFOB 0.5 | PGLST 0.3 | — | 366 | 238 | 65 | 361 | 224 | 62 |
| Comparative Example 115 | LiFOB 0.5 | PGLST 1.0 | — | 365 | 230 | 63 | 365 | 234 | 64 |
| Comparative Example 108 | LiFOB 0.3 | — | EPRS 0.1 | 388 | 213 | 55 | 395 | 221 | 56 |
| Comparative Example 109 | LiFOB 0.3 | — | EPRS 0.5 | 390 | 254 | 65 | 393 | 259 | 66 |
| Comparative Example 110 | LiFOB 0.5 | — | EPRS 0.1 | 392 | 224 | 57 | 389 | 230 | 59 |
| Comparative Example 111 | LiFOB 0.5 | — | EPRS 0.5 | 393 | 252 | 64 | 390 | 254 | 65 |
| Comparative Example 96 | — | PGLST 0.3 | EPRS 0.1 | 400 | 256 | 64 | 403 | 250 | 62 |
| Comparative Example 97 | — | PGLST 0.3 | EPRS 0.5 | 367 | 231 | 63 | 364 | 240 | 66 |
| Comparative Example 98 | — | PGLST 1.0 | EPRS 0.1 | 405 | 267 | 66 | 400 | 268 | 67 |
| Comparative Example 99 | — | PGLST 1.0 | EPRS 0.5 | 372 | 249 | 67 | 374 | 247 | 66 |
| Comparative Example 28 | LiFOB 0.3 | — | — | 375 | 169 | 45 | 376 | 165 | 44 |
| Comparative Example 29 | LiFOB 0.5 | — | — | 374 | 165 | 44 | 377 | 162 | 43 |
| Comparative Example 62 | — | PGLST 0.3 | — | 391 | 235 | 60 | 388 | 229 | 59 |
| Comparative Example 63 | — | PGLST 1.0 | — | 390 | 230 | 59 | 392 | 239 | 61 |
| Comparative Example 82 | — | — | EPRS 0.1 | 348 | 171 | 49 | 345 | 179 | 52 |
| Comparative Example 83 | — | — | EPRS 0.5 | 315 | 161 | 51 | 310 | 164 | 53 |
| Comparative Example 19 | — | — | — | 382 | 145 | 38 | 389 | 136 | 35 |

TABLE 18

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 236 | LiBOB 0.3 | GLST 0.3 | PRS 0.1 | 334 | 281 | 84 | 329 | 280 | 85 |
| Example 237 | LiBOB 0.3 | GLST 0.5 | PRS 0.1 | 334 | 286 | 85 | 333 | 286 | 86 |
| Example 238 | LiBOB 0.3 | GLST 1.0 | PRS 0.1 | 334 | 291 | 87 | 332 | 282 | 85 |
| Example 239 | LiBOB 0.3 | GLST 0.3 | PRS 0.3 | 312 | 265 | 85 | 311 | 264 | 85 |
| Example 240 | LiBOB 0.3 | GLST 0.3 | PRS 0.5 | 298 | 262 | 88 | 299 | 266 | 89 |
| Example 241 | LiBOB 0.5 | GLST 0.3 | PRS 0.1 | 334 | 287 | 86 | 331 | 295 | 89 |
| Example 242 | LiBOB 0.5 | GLST 0.5 | PRS 0.1 | 340 | 296 | 87 | 337 | 300 | 89 |
| Example 243 | LiBOB 0.5 | GLST 1.0 | PRS 0.1 | 335 | 295 | 88 | 336 | 289 | 86 |
| Example 244 | LiBOB 0.5 | GLST 0.3 | PRS 0.3 | 311 | 264 | 85 | 309 | 260 | 84 |
| Example 245 | LiBOB 0.5 | GLST 0.3 | PRS 0.5 | 298 | 262 | 88 | 297 | 264 | 89 |
| Example 246 | LiBOB 0.5 | GLST 0.5 | PRS 0.5 | 297 | 261 | 88 | 296 | 263 | 89 |
| Example 247 | LiBOB 0.5 | GLST 1.0 | PRS 0.5 | 295 | 260 | 88 | 295 | 263 | 89 |
| Comparative Example 116 | LiBOB 0.3 | GLST 0.3 | — | 348 | 244 | 70 | 347 | 246 | 71 |
| Comparative Example 117 | LiBOB 0.3 | GLST 1.0 | — | 345 | 235 | 68 | 343 | 237 | 69 |
| Comparative Example 118 | LiBOB 0.5 | GLST 0.3 | — | 346 | 242 | 70 | 344 | 241 | 70 |
| Comparative Example 119 | LiBOB 0.5 | GLST 1.0 | — | 344 | 230 | 67 | 343 | 237 | 69 |
| Comparative Example 34 | LiBOB 0.3 | — | PRS 0.1 | 324 | 220 | 68 | 322 | 216 | 67 |
| Comparative Example 35 | LiBOB 0.3 | — | PRS 0.5 | 288 | 222 | 77 | 286 | 215 | 75 |
| Comparative Example 36 | LiBOB 0.5 | — | PRS 0.1 | 322 | 222 | 69 | 321 | 225 | 70 |
| Comparative Example 37 | LiBOB 0.5 | — | PRS 0.5 | 281 | 214 | 76 | 284 | 219 | 77 |
| Comparative Example 48 | — | GLST 0.3 | PRS 0.1 | 372 | 257 | 69 | 371 | 256 | 69 |
| Comparative Example 49 | — | GLST 0.3 | PRS 0.5 | 333 | 250 | 75 | 334 | 254 | 76 |
| Comparative Example 50 | — | GLST 1.0 | PRS 0.1 | 374 | 258 | 69 | 375 | 259 | 69 |
| Comparative Example 51 | — | GLST 1.0 | PRS 0.5 | 345 | 259 | 75 | 346 | 256 | 74 |
| Comparative Example 42 | LiBOB 0.3 | — | — | 351 | 183 | 52 | 353 | 184 | 52 |
| Comparative Example 43 | LiBOB 0.5 | — | — | 348 | 188 | 54 | 346 | 190 | 55 |
| Comparative Example 52 | — | GLST 0.3 | — | 390 | 230 | 59 | 387 | 224 | 58 |

TABLE 18-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Comparative Example 53 | — | GLST 1.0 | — | 392 | 235 | 60 | 395 | 237 | 60 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 19

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 248 | LiBOB 0.3 | GLST 0.3 | MPRS 0.1 | 354 | 297 | 84 | 356 | 292 | 82 |
| Example 249 | LiBOB 0.3 | GLST 0.5 | MPRS 0.1 | 356 | 299 | 84 | 357 | 296 | 83 |
| Example 250 | LiBOB 0.3 | GLST 1.0 | MPRS 0.1 | 351 | 302 | 86 | 354 | 304 | 86 |
| Example 251 | LiBOB 0.3 | GLST 0.3 | MPRS 0.3 | 326 | 274 | 84 | 328 | 282 | 86 |
| Example 252 | LiBOB 0.3 | GLST 0.3 | MPRS 0.5 | 314 | 270 | 86 | 316 | 275 | 87 |
| Example 253 | LiBOB 0.5 | GLST 0.3 | MPRS 0.1 | 359 | 302 | 84 | 357 | 307 | 86 |
| Example 254 | LiBOB 0.5 | GLST 0.5 | MPRS 0.1 | 357 | 296 | 83 | 354 | 294 | 83 |
| Example 255 | LiBOB 0.5 | GLST 1.0 | MPRS 0.1 | 357 | 300 | 84 | 355 | 302 | 85 |
| Example 256 | LiBOB 0.5 | GLST 0,3 | MPRS 0.3 | 330 | 277 | 84 | 331 | 278 | 84 |
| Example 257 | LiBOB 0.5 | GLST 0.3 | MPRS 0.5 | 315 | 271 | 86 | 316 | 272 | 86 |
| Example 258 | LiBOB 0.5 | GLST 0.5 | MPRS 0.5 | 315 | 271 | 86 | 315 | 274 | 87 |
| Example 259 | LiBOB 0.5 | GLST 1.0 | MPRS 0.5 | 317 | 269 | 85 | 318 | 273 | 86 |
| Comparative Example 120 | LiBOB 0.3 | — | MFRS 0.1 | 366 | 223 | 61 | 367 | 228 | 62 |
| Comparative Example 121 | LiBOB 0.3 | — | MFRS 0.5 | 334 | 237 | 71 | 337 | 236 | 70 |
| Comparative Example 122 | LiBOB 0.5 | — | MFRS 0.1 | 365 | 230 | 63 | 364 | 233 | 64 |
| Comparative Example 123 | LiBOB 0.5 | — | MPRS 0.5 | 331 | 228 | 69 | 334 | 234 | 70 |
| Comparative Example 116 | LiBOB 0.3 | GLST 0.3 | — | 348 | 244 | 70 | 347 | 246 | 71 |
| Comparative Example 117 | LiBOB 0.3 | GLST 1.0 | — | 345 | 235 | 68 | 343 | 237 | 69 |
| Comparative Example 118 | LiBOB 0.5 | GLST 0.3 | — | 346 | 242 | 70 | 344 | 241 | 70 |
| Comparative Example 119 | LiBOB 0.5 | GLST 1.0 | — | 344 | 230 | 67 | 343 | 237 | 69 |
| Comparative Example 84 | — | GLST 0.3 | MPRS 0.1 | 389 | 257 | 66 | 390 | 261 | 67 |
| Comparative Example 85 | — | GLST 0.3 | MPRS 0.5 | 362 | 253 | 70 | 360 | 256 | 71 |
| Comparative Example 86 | — | GLST 1.0 | MPRS 0.1 | 390 | 265 | 68 | 391 | 270 | 69 |
| Comparative Example 87 | — | GLST 1.0 | MPRS 0.5 | 364 | 258 | 71 | 361 | 256 | 71 |
| Comparative Example 42 | LiBOB 0.3 | — | — | 351 | 183 | 52 | 353 | 184 | 52 |
| Comparative Example 43 | LiBOB 0.5 | — | — | 348 | 188 | 54 | 346 | 190 | 55 |
| Comparative Example 52 | — | GLST 0.3 | — | 390 | 230 | 59 | 387 | 224 | 58 |
| Comparative Example 53 | — | GLST 1.0 | — | 392 | 235 | 60 | 395 | 237 | 60 |
| Comparative Example 72 | — | — | MPRS 0.1 | 335 | 184 | 55 | 334 | 180 | 54 |
| Comparative Example 73 | — | — | MPRS 0.5 | 308 | 176 | 57 | 310 | 171 | 55 |
| Comparative Example 19 | — | — | — | 382 | 145 | 38 | 389 | 136 | 35 |

TABLE 20

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 260 | LiBOB 0.3 | GLST 0.3 | EPRS 0.1 | 360 | 295 | 82 | 362 | 293 | 81 |
| Example 261 | LiBOB 0.3 | GLST 0.5 | EPRS 0.1 | 361 | 292 | 81 | 360 | 295 | 82 |
| Example 262 | LiBOB 0.3 | GLST 1.0 | EPRS 0.1 | 359 | 305 | 85 | 357 | 303 | 85 |
| Example 263 | LiBOB 0.3 | GLST 0.3 | EPRS 0.3 | 335 | 275 | 82 | 334 | 274 | 82 |
| Example 264 | LiBOB 0.3 | GLST 0.3 | EPRS 0.5 | 316 | 269 | 85 | 320 | 275 | 86 |
| Example 265 | LiBOB 0.5 | GLST 0.3 | EPRS 0.1 | 367 | 301 | 82 | 368 | 302 | 82 |
| Example 266 | LiBOB 0.5 | GLST 0.5 | EPRS 0.1 | 364 | 295 | 81 | 360 | 295 | 82 |
| Example 267 | LiBOB 0.5 | GLST 1.0 | EPRS 0.1 | 365 | 296 | 81 | 361 | 300 | 83 |
| Example 268 | LiBOB 0.5 | GLST 0.3 | EPRS 0.3 | 334 | 274 | 82 | 333 | 276 | 83 |
| Example 269 | LiBOB 0.5 | GLST 0.3 | EPRS 0.5 | 316 | 265 | 84 | 318 | 273 | 86 |

TABLE 20-continued

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 270 | LiBOB 0.5 | GLST 0.5 | EPRS 0.5 | 315 | 268 | 85 | 316 | 272 | 86 |
| Example 271 | LiBOB 0.5 | GLST 1.0 | EPRS 0.5 | 318 | 273 | 86 | 319 | 271 | 85 |
| Comparative Example 124 | LiBOB 0.3 | — | EPRS 0.1 | 375 | 221 | 59 | 381 | 232 | 61 |
| Comparative Example 125 | LiBOB 0.3 | — | EPRS 0.5 | 374 | 258 | 69 | 379 | 269 | 71 |
| Comparative Example 126 | LiBOB 0.5 | — | EPRS 0.1 | 376 | 229 | 61 | 373 | 231 | 62 |
| Comparative Example 127 | LiBOB 0.5 | — | EPRS 0.5 | 374 | 254 | 68 | 378 | 261 | 69 |
| Comparative Example 88 | — | GLST 0.3 | EPRS 0.1 | 402 | 261 | 65 | 399 | 251 | 63 |
| Comparative Example 89 | — | GLST 0.3 | EPRS 0.5 | 366 | 234 | 64 | 364 | 240 | 66 |
| Comparative Example 90 | — | GLST 1.0 | EPRS 0.1 | 408 | 261 | 64 | 405 | 263 | 65 |
| Comparative Example 91 | — | GLST 1.0 | EPRS 0.5 | 374 | 251 | 67 | 374 | 254 | 68 |
| Comparative Example 116 | LiBOB 0.3 | GLST 0.3 | — | 348 | 244 | 70 | 347 | 246 | 71 |
| Comparative Example 117 | LiBOB 0.3 | GLST 1.0 | — | 345 | 235 | 68 | 343 | 237 | 69 |
| Comparative Example 118 | LiBOB 0.5 | GLST 0.3 | — | 346 | 242 | 70 | 344 | 241 | 70 |
| Comparative Example 119 | LiBOB 0.5 | GLST 1.0 | — | 344 | 230 | 67 | 343 | 237 | 69 |
| Comparative Example 42 | LiBOB 0.3 | — | — | 351 | 183 | 52 | 353 | 184 | 52 |
| Comparative Example 43 | LiBOB 0.5 | — | — | 348 | 188 | 54 | 346 | 190 | 55 |
| Comparative Example 52 | — | GLST 0.3 | — | 390 | 230 | 59 | 387 | 224 | 58 |
| Comparative Example 53 | — | GLST 1.0 | — | 392 | 235 | 60 | 395 | 237 | 60 |
| Comparative Example 82 | — | — | EPRS 0.1 | 348 | 171 | 49 | 345 | 179 | 52 |
| Comparative Example 83 | — | — | EPRS 0.5 | 315 | 161 | 51 | 310 | 164 | 53 |
| Comparative Example 19 | — | — | — | 382 | 145 | 38 | 389 | 136 | 35 |

TABLE 21

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 272 | LiBOB 0.3 | PGLST 0.3 | PRS 0.1 | 334 | 281 | 84 | 329 | 280 | 85 |
| Example 273 | LiBOB 0.3 | PGLST 0.5 | PRS 0.1 | 336 | 286 | 85 | 333 | 286 | 86 |
| Example 274 | LiBOB 0.3 | PGLST 1.0 | PRS 0.1 | 334 | 291 | 87 | 332 | 282 | 85 |
| Example 275 | LiBOB 0.3 | PGLST 0.3 | PRS 0.3 | 312 | 265 | 85 | 311 | 264 | 85 |
| Example 276 | LiBOB 0.3 | PGLST 0.3 | PRS 0.5 | 298 | 262 | 88 | 299 | 266 | 89 |
| Example 277 | LiBOB 0.5 | PGLST 0.3 | PRS 0.1 | 334 | 287 | 86 | 331 | 295 | 89 |
| Example 278 | LiBOB 0.5 | PGLST 0.5 | PRS 0.1 | 340 | 296 | 87 | 337 | 300 | 89 |
| Example 279 | LiBOB 0.5 | PGLST 1.0 | PRS 0.1 | 335 | 295 | 88 | 336 | 289 | 86 |
| Example 280 | LiBOB 0.5 | PGLST 0.3 | PRS 0.3 | 311 | 264 | 85 | 313 | 263 | 84 |
| Example 281 | LiBOB 0.5 | PGLST 0.3 | PRS 0.5 | 298 | 262 | 88 | 297 | 264 | 89 |
| Example 282 | LiBOB 0.5 | PGLST 0.5 | PRS 0.5 | 297 | 261 | 88 | 296 | 263 | 89 |
| Example 283 | LiBOB 0.5 | PGLST 1.0 | PRS 0.5 | 298 | 262 | 88 | 295 | 263 | 89 |
| Comparative Example 128 | LiBOB 0.3 | PGLST 0.3 | — | 345 | 238 | 69 | 346 | 242 | 70 |
| Comparative Example 129 | LiBOB 0.3 | PGLST 1.0 | — | 348 | 240 | 69 | 345 | 242 | 70 |
| Comparative Example 130 | LiBOB 0.5 | PGLST 0.3 | — | 347 | 246 | 71 | 343 | 237 | 69 |
| Comparative Example 131 | LiBOB 0.5 | PGLST 1.0 | — | 342 | 233 | 68 | 345 | 245 | 71 |
| Comparative Example 34 | LiBOB 0.3 | — | PRS 0.1 | 324 | 220 | 68 | 322 | 216 | 67 |
| Comparative Example 35 | LiBOB 0.3 | — | PRS 0.5 | 288 | 222 | 77 | 286 | 215 | 75 |
| Comparative Example 36 | LiBOB 0.5 | — | PRS 0.1 | 322 | 222 | 69 | 321 | 225 | 70 |
| Comparative Example 37 | LiBOB 0.5 | — | PRS 0.5 | 281 | 214 | 76 | 284 | 219 | 77 |
| Comparative Example 58 | — | PGLST 0.3 | PRS 0.1 | 370 | 252 | 68 | 372 | 260 | 70 |
| Comparative Example 59 | — | PGLST 0.3 | PRS 0.5 | 332 | 246 | 74 | 333 | 250 | 75 |
| Comparative Example 60 | — | PGLST 1.0 | PRS 0 1 | 376 | 259 | 69 | 374 | 262 | 70 |
| Comparative Example 61 | — | PGLST 1.0 | PRS 0.5 | 346 | 260 | 75 | 345 | 252 | 73 |
| Comparative Example 42 | LiBOB 0.3 | — | — | 351 | 183 | 52 | 353 | 184 | 52 |
| Comparative Example 43 | LiBOB 0.5 | — | — | 348 | 188 | 54 | 346 | 190 | 55 |
| Comparative Example 62 | — | PGLST 0.3 | — | 391 | 235 | 60 | 388 | 229 | 59 |
| Comparative Example 63 | — | PGLST 1.0 | — | 390 | 230 | 59 | 392 | 239 | 61 |
| Comparative Example 17 | — | — | PRS 0.1 | 306 | 183 | 60 | 319 | 195 | 61 |
| Comparative Example 18 | — | — | PRS 0.5 | 248 | 171 | 69 | 265 | 180 | 68 |
| Comparative Example 19 | — | — | — | 382 | 145 | 38 | 389 | 136 | 35 |

TABLE 22

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 284 | LiBOB 0.3 | PGLST 0.3 | MPRS 0.1 | 352 | 296 | 84 | 354 | 287 | 81 |
| Example 285 | LiBOB 0.3 | PGLST 0.5 | MPRS 0.1 | 354 | 301 | 85 | 356 | 299 | 84 |
| Example 286 | LiBOB 0.3 | PGLST 1.0 | MPRS 0.1 | 351 | 298 | 85 | 355 | 302 | 85 |
| Example 287 | LiBOB 0.3 | PGLST 0.3 | MPRS 0.3 | 327 | 278 | 85 | 329 | 283 | 86 |
| Example 288 | LiBOB 0.3 | PGLST 0.3 | MPRS 0.5 | 316 | 269 | 85 | 320 | 275 | 86 |
| Example 289 | LiBOB 0.5 | PGLST 0.3 | MPRS 0.1 | 357 | 303 | 85 | 360 | 310 | 86 |
| Example 290 | LiBOB 0.5 | PGLST 0.5 | MPRS 0.1 | 355 | 298 | 84 | 354 | 294 | 83 |
| Example 291 | LiBOB 0.5 | PGLST 1.0 | MPRS 0.1 | 358 | 297 | 83 | 356 | 299 | 84 |
| Example 292 | LiBOB 0.5 | PGLST 0.3 | MPRS 0.3 | 331 | 275 | 83 | 335 | 281 | 84 |
| Example 293 | LiBOB 0.5 | PGLST 0.3 | MPRS 0.5 | 316 | 272 | 86 | 320 | 272 | 85 |
| Example 294 | LiBOB 0.5 | PGLST 0.5 | MPRS 0.5 | 315 | 271 | 86 | 318 | 273 | 86 |
| Example 295 | LiBOB 0.5 | PGLST 1.0 | MPRS 0.5 | 318 | 273 | 86 | 317 | 276 | 87 |
| Comparative Example 128 | LiBOB 0.3 | PGLST 0.3 | — | 345 | 238 | 69 | 346 | 242 | 70 |
| Comparative Example 129 | LiBOB 0.3 | PGLST 1.0 | — | 348 | 240 | 69 | 345 | 242 | 70 |
| Comparative Example 130 | LiBOB 0.5 | PGLST 0.3 | — | 347 | 246 | 71 | 343 | 237 | 69 |
| Comparative Example 131 | LiBOB 0.5 | PGLST 1.0 | — | 342 | 233 | 68 | 345 | 245 | 71 |
| Comparative Example 120 | LiBOB 0.3 | — | MPRS 0.1 | 366 | 223 | 61 | 367 | 228 | 62 |
| Comparative Example 121 | LiBOB 0.3 | — | MPRS 0.5 | 334 | 237 | 71 | 337 | 236 | 70 |
| Comparative Example 122 | LiBOB 0.5 | — | MPRS 0.1 | 365 | 230 | 63 | 364 | 233 | 64 |
| Comparative Example 123 | LiBOB 0.5 | — | MPRS 0.5 | 331 | 228 | 69 | 334 | 234 | 70 |
| Comparative Example 92 | — | PGLST 0.3 | MPRS 0.1 | 392 | 259 | 66 | 397 | 266 | 67 |
| Comparative Example 93 | — | PGLST 0.3 | MPRS 0.5 | 357 | 243 | 68 | 360 | 252 | 70 |
| Comparative Example 94 | — | PGLST 1.0 | MPRS 0.1 | 389 | 268 | 69 | 392 | 270 | 69 |
| Comparative Example 95 | — | PGLST 1.0 | MPRS 0.5 | 364 | 258 | 71 | 362 | 261 | 72 |
| Comparative Example 42 | LiBOB 0.3 | — | — | 351 | 183 | 52 | 353 | 184 | 52 |
| Comparative Example 43 | LiBOB 0.5 | — | — | 348 | 188 | 54 | 346 | 190 | 55 |
| Comparative Example 62 | — | PGLST 0.3 | — | 391 | 235 | 60 | 388 | 229 | 59 |
| Comparative Example 63 | — | PGLST 1.0 | — | 390 | 230 | 59 | 392 | 239 | 61 |
| Comparative Example 72 | — | — | MPRS 0.1 | 335 | 184 | 55 | 334 | 180 | 54 |
| Comparative Example 73 | — | — | MPRS 0.5 | 308 | 176 | 57 | 310 | 171 | 55 |
| Comparative Example 19 | — | — | — | 382 | 145 | 38 | 389 | 136 | 35 |

TABLE 23

| | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 296 | LiBOB 0.3 | PGLST 0.3 | EPRS 0.1 | 361 | 292 | 81 | 359 | 294 | 82 |
| Example 297 | LiBOB 0.3 | PGLST 0.5 | EPRS 0.1 | 359 | 294 | 82 | 360 | 292 | 81 |
| Example 298 | LiBOB 0.3 | PGLST 1.0 | EPRS 0.1 | 357 | 300 | 84 | 355 | 298 | 84 |
| Example 299 | LiBOB 0.3 | PGLST 0.3 | EPRS 0.3 | 336 | 272 | 81 | 338 | 277 | 82 |
| Example 300 | LiBOB 0.3 | PGLST 0.3 | EPRS 0.5 | 317 | 273 | 86 | 318 | 270 | 85 |
| Example 301 | LiBOB 0.5 | PGLST 0.3 | EPRS 0.1 | 364 | 302 | 83 | 366 | 300 | 82 |
| Example 302 | LiBOB 0.5 | PGLST 0.5 | EPRS 0.1 | 363 | 298 | 82 | 360 | 295 | 82 |
| Example 303 | LiBOB 0.5 | PGLST 1.0 | EPRS 0.1 | 361 | 296 | 82 | 363 | 301 | 83 |
| Example 304 | LiBOB 0.5 | PGLST 0.3 | EPRS 0.3 | 330 | 271 | 82 | 329 | 273 | 83 |
| Example 305 | LiBOB 0.5 | PGLST 0.3 | EPRS 0.5 | 320 | 272 | 85 | 318 | 273 | 86 |
| Example 306 | LiBOB 0.5 | PGLST 0.5 | EPRS 0.5 | 316 | 272 | 86 | 316 | 272 | 86 |
| Example 307 | LiBOB 0.5 | PGLST 1.0 | EPRS 0.5 | 319 | 278 | 87 | 320 | 272 | 85 |
| Comparative Example 128 | LiBOB 0.3 | PGLST 0.3 | — | 345 | 238 | 69 | 346 | 242 | 70 |
| Comparative Example 129 | LiBOB 0.3 | PGLST 1.0 | — | 348 | 240 | 69 | 345 | 242 | 70 |
| Comparative Example 130 | LiBOB 0.5 | PGLST 0.3 | — | 347 | 246 | 71 | 343 | 237 | 69 |
| Comparative Example 131 | LiBOB 0.5 | PGLST 1.0 | — | 342 | 233 | 68 | 345 | 245 | 71 |
| Comparative Example 124 | LiBOB 0.3 | — | EPRS 0.1 | 375 | 221 | 59 | 381 | 232 | 61 |
| Comparative Example 125 | LiBOB 0.3 | — | EPRS 0.5 | 374 | 258 | 69 | 379 | 269 | 71 |
| Comparative Example 126 | LiBOB 0.5 | — | ERRS 0.1 | 376 | 229 | 61 | 373 | 231 | 62 |
| Comparative Example 127 | LiBOB 0.5 | — | EPRS 0.5 | 374 | 254 | 68 | 378 | 261 | 69 |
| Comparative Example 96 | — | PGLST 0.3 | EPRS 0.1 | 400 | 256 | 64 | 403 | 250 | 62 |
| Comparative Example 97 | — | PGLST 0.3 | EPRS 0.5 | 367 | 231 | 63 | 364 | 240 | 66 |
| Comparative Example 98 | — | PGLST 1.0 | EPRS 0.1 | 405 | 267 | 66 | 400 | 268 | 67 |
| Comparative Example 99 | — | PGLST 1.0 | EPRS 0.5 | 372 | 249 | 67 | 374 | 247 | 66 |
| Comparative Example 42 | LiBOB 0.3 | — | — | 351 | 183 | 52 | 353 | 184 | 52 |
| Comparative Example 43 | LiBOB 0.5 | — | — | 348 | 188 | 54 | 346 | 190 | 55 |
| Comparative Example 62 | — | PGLST 0.3 | — | 391 | 235 | 60 | 388 | 229 | 59 |

TABLE 23-continued

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Comparative Example 63 | — | PGLST 1.0 | — | 390 | 230 | 59 | 392 | 239 | 61 |
| Comparative Example 82 | — | — | EPRS 0.1 | 348 | 171 | 49 | 345 | 179 | 52 |
| Comparative Example 83 | — | — | EPRS 0.5 | 315 | 161 | 51 | 310 | 164 | 53 |
| Comparative Example 19 | — | — | — | 382 | 145 | 38 | 389 | 136 | 35 |

TABLE 24

|  | Chemical Formula 1 | Chemical Formula 2 | Chemical Formula 3 | Power before Storage Test [W] | Power after Storage Test [W] | Power Retention Ratio after Storage Test [%] | Power before Cycle Test [W] | Power after Cycle Test [W] | Power Retention Ratio after Cycle Test [%] |
|---|---|---|---|---|---|---|---|---|---|
| Example 4 | LiFOP 0.3 | PEGLST 0.3 | PRS 0.3 | 353 | 332 | 94 | 359 | 334 | 93 |
| Example 308 | LiFOP 0.3 | PEGLST 0.3 | PRS 0.3 | 383 | 326 | 85 | 385 | 331 | 86 |
| Example 309 | LiFOP 0.3 | PEGLST 0.3 | PRS 0.3 | 379 | 277 | 73 | 381 | 267 | 70 |
| Example 310 | LiFOP 0.3 | PEGLST 0.3 | PRS 0.3 | 393 | 263 | 67 | 399 | 251 | 63 |
| Example 4 | LiFOP 0.3 | PEGLST 0.3 | PRS 0.3 | 353 | 332 | 94 | 359 | 334 | 93 |
| Example 311 | LiFOP 0.3 | PEGLST 0.3 | PRS 0.3 | 321 | 270 | 84 | 326 | 261 | 80 |

As is found from the evaluation results, the batteries of Examples were batteries in which a degradation in power performance of each of the batteries due to charge-discharge cycle is adequately suppressed and a degradation in power performance of the battery after the storage test is adequately suppressed.

Describing in detail, it was found that when the compound represented by the general formula (1), the compound represented by the general formula (2) and the compound represented by the general formula (3) are mixed in combination thereof in the electrolyte solution, a degradation in power performance of the battery can be remarkably suppressed even if the battery is left or charged/discharged repeatedly under elevated temperatures of 60° C. or the like.

Specifically, a degradation in power performance of the battery was specifically suppressed when in the electrolyte solution, the content of the compound represented by the general formula (1) (particularly LiFOP) was not less than 0.3% by mass and not more than 0.5% by mass, the content of the compound represented by the general formula (2) (particularly PEGLST) was not less than 0.3% by mass and not more than 1.0% by mass, and the content of the compound represented by the general formula (3) (particularly PRS) was not less than 0.1% by mass and not more than 0.5% by mass.

As is found from the above-mentioned results, when LiFOP, PEGLST and PRS are included in combination thereof in the electrolyte solution, this brought a better result that a degradation in power performance of the battery was specifically suppressed than the case in which one compound alone or any two compounds of LiFOP, PEGLST and PRS are included in the electrolyte solution.

The mechanism of exerting this performance is not necessarily clear at the present time; however, it is guessed that a decomposition reaction of the electrolyte solution was suppressed because a composite coating derived from the above-mentioned three compounds was formed on the positive electrode or the negative electrode.

What is claimed is:

1. An energy storage device comprising an electrolyte solution including a compound represented by the general formula (1), a compound represented by the general formula (2), and a compound represented by the general formula (3):

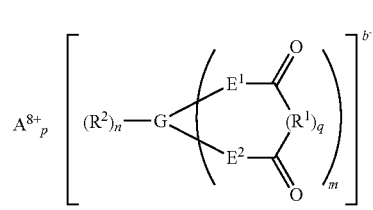

General Formula (1)

wherein G represents a transition metal, or an element of Group 13, Group 14, or Group 15 of a periodic table, $A^{a+}$ represents a metal ion, a proton or an onium ion, a represents an integer of 1 to 3, b represents an integer of 1 to 3, p represents b/a, m represents an integer of 1 to 4, n represents an integer of 0 to 8, q represents 0 or 1, $R^1$ represents an alkylene group having 1 to 10 carbon atoms, a halogenated alkylene group having 1 to 10 carbon atoms, an arylene group having 6 to 20 carbon atoms or a halogenated arylene group having 6 to 20 carbon atoms (these alkylene group and arylene group may have a substituent or a heteroatom in their structure), $R^2$ represents halogen, an alkyl group having 1 to 10 carbon atoms, a halogenated alkyl group having 1 to 10 carbon atoms, an aryl group having 6 to 20 carbon atoms, a halogenated aryl group having 6 to 20 carbon atoms, or $E^3R^3$ (these alkyl group and aryl group may have a substituent or a heteroatom in their structure), $E^1$, $E^2$ and $E^3$ independently represent O, S or $NR^4$, and $R^3$ and $R^4$ independently represent hydrogen, an alkyl group having 1 to 10 carbon atoms, a halogenated alkyl group having 1 to 10 carbon atoms, an aryl group having 6 to 20 carbon atoms, or a halogenated aryl group having 6 to 20 carbon atoms (these alkyl group and aryl group may have a substituent or a heteroatom in their structure);

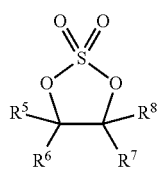

General Formula (2)

wherein $R^5$, $R^6$, $R^7$, and $R^8$ independently represent hydrogen or an alkyl group having 1 to 3 carbon atoms; and

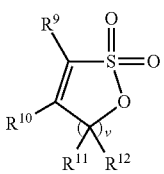

General Formula (3)

wherein $R^9$ to $R^{12}$ represent independently hydrogen, fluorine, or an alkyl group having 1 to 12 carbon atoms which optionally includes fluorine, and v represents an integer of 1 to 3.

2. The energy storage device according to claim 1, wherein the compound represented by the general formula (1) is a compound represented by the following general formula (Ia);

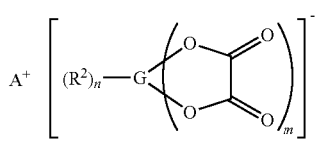

General Formula (1a)

wherein G represents a phosphorus element or a boron element, $A^+$ represents an alkali metal ion, m represents an integer of 1 to 3, n represents an integer of 0 to 4, and $R^2$ represents a halogen.

3. The energy storage device according to claim 1, wherein the compound represented by the general formula (2) is a compound represented by the following general formula (2a):

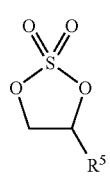

General Formula (2a)

wherein $R^5$ represents hydrogen or an alkyl group having 1 to 3 carbon atoms.

4. The energy storage device according to claim 1, wherein the compound represented by the general formula (3) is a compound represented by the following general formula (3a):

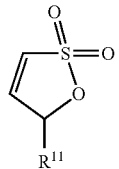

General Formula (3a)

wherein $R^{11}$ represents hydrogen or an alkyl group having 1 to 3 carbon atoms.

5. The energy storage device according to claim 1, wherein the electrolyte solution includes the compound represented by the general formula (1) in an amount of not less than 0.10% by mass and not more than 1.00% by mass.

6. The energy storage device according to claim 1, wherein the electrolyte solution includes the compound represented by the general formula (2) in an amount of not less than 0.10% by mass and not more than 2.00% by mass.

7. The energy storage device according to claim 1, wherein the electrolyte solution includes the compound represented by the general formula (3) in an amount of not less than 0.05% by mass and not more than 1.00% by mass.

8. The energy storage device according to claim 1, wherein the mass ratio between the compound represented by the general formula (1) and the compound represented by the general formula (2) is 1:0.10 to 1:20.

9. The energy storage device according to claim 1, wherein the mass ratio between the compound represented by the general formula (1) and the compound represented by the general formula (3) is 1:0.05 to 1:10.

10. The energy storage device according to claim 1, wherein the mass ratio between the compound represented by the general formula (2) and the compound represented by the general formula (3) is 1:0.025 to 1:10.

11. The energy storage device according to claim 1, further comprising:
a positive electrode,
wherein the positive electrode contains a positive active material and the positive active material is a lithium metal composite oxide represented by the chemical composition of $Li_xNi_yMn_zCo_{(1-y-z)}O_2$ ($0<x\leq1.3$, $0<y<1$, and $0<z<1$).

12. The energy storage device according to claim 1, further comprising:
a negative electrode,
wherein the negative electrode contains a negative active material and the negative active material is non-graphitizable carbon.

13. The energy storage device according to claim 1, further comprising:
a negative electrode,
wherein the negative electrode contains a negative active material and the negative active material is in the form of particles and an average particle size D50 of the negative active material is 1.0 μm or more and 4.5 μm or less.

14. The energy storage device according to claim 12, wherein the negative active material is in the form of particles and an average particle size D50 of the negative active material is 1.0 μm or more and 4.5 μm or less.

15. The energy storage device according to claim 1, wherein the compound represented by the general formula (1) is at least one selected from the group consisting of a compound represented by the formula (1-1), a compound represented by the formula (1-2) and a compound represented by the formula (1-3);

the compound represented by the general formula (2) is at least one selected from the group consisting of a compound represented by the formula (2-1), a compound represented by the formula (2-2) and a compound represented by the formula (2-3); and the compound represented by the general formula (3) is at least one selected from the group consisting of a compound represented by the formula (3-1), a compound represented by the formula (3-2) and a compound represented by the formula (3-3);

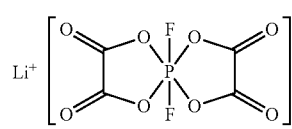

Formula (1-1)

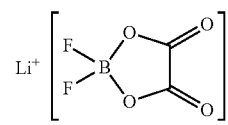

Formula (1-2)

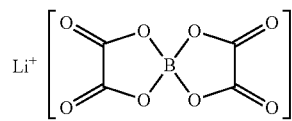

Formula (1-3)

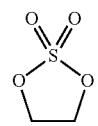

Formula (2-1)

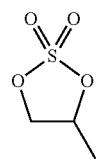

Formula (2-2)

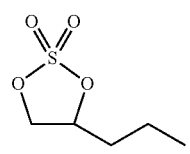

Formula (2-3)

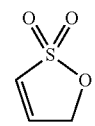

Formula (3-1)

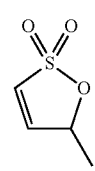

Formula (3-2)

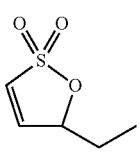

Formula (3-3)

16. The energy storage device according to claim 1, wherein the electrolyte solution comprises the compound represented by the general formula (1) in an amount of not less than 0.30% by mass and not more than 0.50% by mass.

17. The energy storage device according to claim 1, wherein the electrolyte solution comprises the compound represented by the general formula (2) in an amount of not less than 0.30% by mass and not more than 1.0% by mass.

18. The energy storage device according to claim 1, wherein the electrolyte solution comprises the compound represented by the general formula (3) in an amount of not less than 0.10% by mass and not more than 0.50% by mass.

* * * * *